US012767772B2

(12) United States Patent
Pyun et al.

(10) Patent No.: US 12,767,772 B2
(45) **Date of Patent: *Oct. 20, 2026**

(54) CHALCOGENIDE HYBRID INORGANIC/ORGANIC POLYMER (CHIP) MATERIALS AS IMPROVED CROSSLINKING AGENTS FOR VULCANIZATION

(71) Applicant: ARIZONA BOARD OF REGENTS ON BEHALF OF THE UNIVERSITY OF ARIZONA, Tucson, AZ (US)

(72) Inventors: Dong-Chul Pyun, Tucson, AZ (US); Richard S. Glass, Tucson, AZ (US); Kyle Carothers, Tucson, AZ (US); Yueyan Zhang, Tucson, AZ (US); Taeheon Lee, Tucson, AZ (US); Kyung-Seok Kang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 431 days.

This patent is subject to a terminal disclaimer.

(21) Appl. No.: 18/332,370

(22) Filed: Jun. 9, 2023

(65) Prior Publication Data

US 2023/0331940 A1 Oct. 19, 2023

Related U.S. Application Data

(63) Continuation-in-part of application No. 16/622,875, filed as application No. PCT/US2018/037598 on Jun. 14, 2018, now Pat. No. 11,674,005.

(60) Provisional application No. 62/520,215, filed on Jun. 15, 2017.

(51) Int. Cl.
*C08J 3/26* (2006.01)
*C08G 75/0209* (2016.01)
*C08G 75/0222* (2016.01)

(52) U.S. Cl.
CPC ............ *C08J 3/26* (2013.01); *C08G 75/0209* (2013.01); *C08G 75/0222* (2013.01); *C08J 2307/02* (2013.01)

(58) Field of Classification Search
None
See application file for complete search history.

(56) References Cited

U.S. PATENT DOCUMENTS

| | | | | |
|---|---|---|---|---|
| 2,779,761 | A | 1/1957 | Kibler | |
| 2,989,513 | A * | 6/1961 | Hendry | C08L 9/00 568/18 |
| 3,251,797 | A | 5/1966 | De Pugh et al. | |
| 3,290,266 | A | 12/1966 | Barnes et al. | |
| 3,542,701 | A | 11/1970 | van Raamsdonk | |
| 3,544,492 | A * | 12/1970 | Son | C08L 21/00 525/50 |
| 3,563,962 | A | 2/1971 | Mirviss | |
| 3,767,613 | A | 10/1973 | Dix et al. | |
| 3,892,686 | A | 7/1975 | Woo | |
| 4,000,347 | A | 12/1976 | Ranney et al. | |
| 4,094,751 | A | 6/1978 | Nozik | |
| 4,238,585 | A | 12/1980 | Bertozzi | |
| 4,346,191 | A | 8/1982 | Blount | |
| 4,382,846 | A | 5/1983 | Gratzel et al. | |
| 4,568,435 | A | 2/1986 | Shelnutt | |
| 4,606,798 | A | 8/1986 | Sasse et al. | |
| 4,671,896 | A | 6/1987 | Hasegawa et al. | |
| 4,739,036 | A | 4/1988 | Colvin et al. | |
| 4,740,559 | A | 4/1988 | Johansson et al. | |
| 4,749,347 | A | 6/1988 | Valavaara | |
| 4,752,507 | A | 6/1988 | Johansson et al. | |
| 4,833,048 | A | 5/1989 | DeJonghe et al. | |
| 5,115,060 | A | 5/1992 | Grey | |
| 5,121,329 | A | 6/1992 | Crump | |
| 5,279,910 | A | 1/1994 | Sasaki et al. | |
| 5,362,493 | A | 11/1994 | Skotheim et al. | |
| 5,371,176 | A | 12/1994 | Bezwada et al. | |
| 5,811,470 | A | 9/1998 | Prindle et al. | |
| 5,929,202 | A | 7/1999 | Arita et al. | |
| 6,011,094 | A | 1/2000 | Planche et al. | |

(Continued)

FOREIGN PATENT DOCUMENTS

| | | | |
|---|---|---|---|
| CN | 104713968 | A1 | 6/2015 |
| EP | 0806451 | A1 | 11/1997 |

(Continued)

OTHER PUBLICATIONS

Ding et al. Photoelectrocatalytic Water Splitting: Significance of Cocatalysts, Electrolyte, and Interfaces. ACS Catal. 2017, 7, 675-688.

Swenson, M. Synthesis and Characterization of [Fe Fe) Hydrogenase Mimics. The University of Arizona, 2013, pp. 1-157 online), [retrieved on Jan. 19, 2018). Retrieved from the Internet <http://arizona.openrepository.com/arizona/handle/1 0150/294029>.

Laitinen, Risto S. "Selenium Sulfide Ring Molecules" 1987, Acta Chemica Scandinavica, A41, p. 361-376) (Year: 1987).

Chung, W.J. et al., "Elemental Sulfur as a Reactive Medium for Gold Nanoparticles and Nanocomposite Materials", Angewandte Chemie International Edition, 2011, 50, 11409-11412.

Colquhoun, Howard M., "Materials that heal themselves", Nature Chemistry, Jun. 2012, vol. 4, 435-436.

(Continued)

*Primary Examiner* — Christopher M Rodd

(74) *Attorney, Agent, or Firm* — NGUYEN TARBET IP LAW

(57) ABSTRACT

Methods of vulcanization using a high content sulfur polymer, instead of elemental sulfur, have been developed. These high sulfur content polymers are referred to as Chalcogenide Hybrid Inorganic/Organic Polymers (CHIP) materials and have good polymer compatibility in that they are soluble in a number of polymers. Furthermore, CHIP materials may have weaker bonds than the S—S bonds of elemental sulfur and thus provide for a higher crosslinking efficiency vulcanization.

19 Claims, 14 Drawing Sheets

(56) References Cited

U.S. PATENT DOCUMENTS

| | | | |
|---|---|---|---|
| 6,072,026 | A | 6/2000 | Kawase et al. |
| 6,111,030 | A | 8/2000 | Hartman et al. |
| 6,180,691 | B1 | 1/2001 | Cheng et al. |
| 9,306,218 | B2 | 4/2016 | Pyun et al. |
| 9,321,871 | B2 | 4/2016 | Schultz et al. |
| 9,463,597 | B2 | 10/2016 | Van De Vrie et al. |
| 9,567,439 | B1 | 2/2017 | Pyun et al. |
| 2001/0047403 | A1 | 11/2001 | Okoroafor et al. |
| 2002/0039680 | A1 | 4/2002 | Hwang et al. |
| 2003/0060567 | A1 | 3/2003 | Faderl et al. |
| 2007/0010600 | A1 | 1/2007 | Goodman et al. |
| 2007/0253772 | A1 | 11/2007 | Kubo et al. |
| 2008/0038645 | A1 | 2/2008 | Kolosnitsyn et al. |
| 2010/0029163 | A1 | 2/2010 | Ogle et al. |
| 2010/0331515 | A1 | 12/2010 | Takeuchi et al. |
| 2011/0245360 | A1 | 10/2011 | Hahn et al. |
| 2011/0263755 | A1 | 10/2011 | Mohamed et al. |
| 2012/0264837 | A1 | 10/2012 | Eberstaller et al. |
| 2013/0040197 | A1 | 2/2013 | Liu et al. |
| 2013/0064904 | A1 | 3/2013 | Gojon-Romanillos et al. |
| 2014/0110881 | A1 | 4/2014 | Keledjian et al. |
| 2014/0199592 | A1 | 7/2014 | Pyun et al. |
| 2015/0203638 | A1 | 7/2015 | Sivanandan et al. |
| 2018/0079865 | A1 | 3/2018 | Pyun |
| 2018/0100037 | A1 | 4/2018 | Pyun |
| 2018/0105649 | A1 | 4/2018 | Pyun et al. |
| 2018/0186967 | A1 | 7/2018 | Pyun |
| 2018/0208686 | A1 | 7/2018 | Pyun et al. |

FOREIGN PATENT DOCUMENTS

| | | | | |
|---|---|---|---|---|
| EP | 1882713 | A1 | 1/2008 | |
| EP | 2093605 | A1 | 8/2009 | |
| EP | 2896644 | A1 | 7/2015 | |
| GB | 1203577 | A | 8/1970 | |
| GB | 1516554 | A | 7/1978 | |
| WO | 1995018652 | A1 | 7/1995 | |
| WO | 2007076067 | A3 | 7/2007 | |
| WO | 2009158385 | A | 12/2009 | |
| WO | 2013023216 | A1 | 2/2013 | |
| WO | 2013155038 | A1 | 10/2013 | |
| WO | 2014052255 | A1 | 4/2014 | |
| WO | 2014179100 | A1 | 11/2014 | |
| WO | 2015123552 | A1 | 8/2015 | |
| WO | WO-2017011533 | A1 * | 1/2017 | ............. C08G 79/00 |

OTHER PUBLICATIONS

Yang, Ying and Urban Marek W., "Self-healing polymeric materials", Chem. Soc. Rev., 2013, 42, 7446-7467.
Hasegawa, Urara and Van Der Vlies, André J., "Design and Synthesis of Polymeric Hydrogen Sulfide Donors", Bioconjugate Chemistry, 2014, 25 (7), 1290-1300.
Foster, Jeffrey C., et al., "S-Aroylthiooximes: A Facile Route to Hydrogen Sulfide Releasing Compounds with Structure-Dependent Release Kinetics", Organic Letters. 2014, 16, 1558-1561.
Wurthner, F., "Perylene bisimide dyes as versatile building blocks for functional supramolecular architectures", Chem. Commun. 2004, 1564-1579.
Chung, W.-. et al., "The use of elemental sulfur as an alternative feedstock for polymeric materials", Nature Chemistry 2013, vol. 5, 518-524.
Simmonds, A.G. et al., "Inverse Vulcanization of Elemental Sulfur to Prepare Polymeric Electrode Materials for Li—S Batteries", ACS Macro Lett. 2014, 3, 229-232.
Liu, G. et al., "α-Sulfur Crystals as a Visible-Light-Active Photocatalyst", J. Am. Chem. Soc. 2012, 134, 9070-9073.
Asmus, K.-D., "Pulse Radiolysis Methodology", Methods in Enzymology 1984, 105, 167-178.
Nishide, et al., "Toward Flexible Batteries", (2008) Science, vol. 319, 737-738.
Nishide, et al., "Emerging N-Type Redox-Active Radical Polymer for a Totally Organic Polymer-Based Rechargeable Battery", (2009), Adv Mater, 21, 1627-1630.
Tarascon, et al., "Key challenges in future Li-battery research", (2010) Phil Trans R Soc A, 368, 3227.
Rotinjanz, et al. "Viscosity of Liquid Sulphur" (1908) Z. Physik Chem, 62, 609.
Bacon, et al., "The Viscosity of Sulfur", (1943) J Am Chem Soc, 65, 639.
Eyring, et al., "The Properties of Liquid Sulfur", (1943) J Am Chem 65, 648.
Tobolsky, A. V. et al., "Equilibrium Polymerization of Sulfur", Am. Chem. Soc. 1959, 81, 780.
Penczek, et al. "Anionic copolymerisation of elemental sulphur" (1974) Nature, 273, 738.
Nazar et al., "A highly ordered nanostructured carbon-sulphur cathode for lithium-sulphur batteries", Nature Mater. 2009, 8, 500-506.
Scrosati, et al., "A High-Performance Polymer Tin Sulfur Lithium Ion Battery", Angew. Chem. Int. Ed. 2010, 49, 2371-2374.
Chen, et al., "Sulfur/polythiophene with a core/shell structure: synthesis and electrochemical properties of the cathode for rechargeable lithium batteries." J. Phys. Chern. C 2011, 115, 6057-6063.
Yang, et al., "Improving the performance of lithium-sulfur batteries by conductive polymer coating." ACS Nano 2011, 5, 9187-9193.
Bartlett, et al., "Reactions of elemental sulfur. I. The uncatalyzed reaction of sulfur with triarylphosphines." (1956) J Am Chern Soc, 78, 3710.
Mcgrath, et al. "Novel carbazole phenoxy-based methacrylates to produce high-refractive index polymers." (2006) Polymer, 47, 4042.
Ueda et al., "High refractive index polymers: fundamental research and practical applications." (2009) J Mater Chem, 19, 8907.
Trofimov, et al. (2002) "Sulfur-rich copolymers of sulfur with 5-vinylbicyclo hept-2-ene and tricyclo deca-3,8-diene as prospective cathode materials for lithium cells," Sufur Letters, 25: 219-227.
Ning, et al., (2004) "Novel cathode material based on chloropolystyrene," PMSE Preprints, American Chemical Society 90: 396-397.
Wang, et al., "Graphene-wrapped sulfur particles as a rechargeable lithium-sulfur battery cathode material with high capacity and cycling stability." Nano Lett. 2011, 11, 2644-2647.
Zheng, et al., "Hollow carbon nanofiber-encapsulated sulfur cathodes for high specific capacity rechargeable lithium batteries." Nano Lett. 2011, 11, 4462-4467.
Li, et al., "High-performance hollow sulfur nanostructured battery cathode through a scalable, room temperature, one-step, bottom-up approach." Proc. Nail. Acad. Sci. U.S.A. 2013, 110, 7148-7153.
Zheng, et al., "Amphiphilic surface modification of hollow carbon nanofibers for improved cycle life of lithium sulfur batteries." Nano Lett. 2013, 13, 1265-1270.
Zhou, et al., "Amylopectin wrapped graphene oxide/sulfur for improved cyclability of lithium-sulfur battery." ACS Nano 2013, 7, 8801-8808.
Seh, et al., "Sulphur-TiO2 yolk-shell nanoarchitecture with internal void space for long-cycle lithium-sulphur batteries." Nat. Commun. 2013, 4.
Li, et al., "Understanding the role of different conductive polymers in improving the nanostructured sulfur cathode performance." Nano Lett. 2013, 13, 5534.
Liu, et al., "A pomegranate-inspired nanoscale design for large-volume change lithium battery anodes." Nat. Nanolech. 2014, 9, 187.
Pyun, J. "Elemental sulfur as a reactive medium for gold nanoparticles and nanocomposite materials." Angew. Chem Int. Ed., 2011, 50, 11409-11412.
Woo et al. "The use of elemental sulfur as an alternative feedstock for polymeric materials." Nature Chemistry. Jun. 2013. vol. 5, pp. 518-524. Published online Apr. 14, 2013.
Suzuki et al. Hydrogen generation using water-insoluble polymer-bound ruthenium(ii) Complexes. Chemical Communications, 1997, Issue 2, p. 227.
Suzuki et al. Photoinduced hydrogen generation from water-insoluble polymer photosensitizer films. Polymer, 1998, vol. 39, Issue 8, p. 1539-1543.

(56) References Cited

OTHER PUBLICATIONS

Suzuki et al. Photoinduced hydrogen generation using polymer photosensitizers. Macromolecular Chemistry and Physics, Jun. 1998, vol. 199, Issue 6.
Wang et al. A metal-free polymeric photocatalyst for hydrogen production from water under visible light. Nature Materials 8, 76-80 (2009).
Goldsmith et al. Discovery and High-Throughput Screening of Heteroleptic Iridium Complexes for Photoinduced Hydrogen Production. J. Am. Chem. Soc., 2005, 127 (20), pp. 7502-7510.
Tinker et al. Visible Light Induced Catalytic Water Reduction without an Electron Relay. Chemistry—A European Journal, 2007, vol. 13, Issue 31, pp. 8726-8732.
Happ et al. Towards Hydrogen Evolution Initiated by LED Light: 2-(1 H-1,2,3-Triazol-4-yl)pyridine containing Polymers as Photocatalyst. Macromolecular Rapid Communications, Apr. 2015, vol. 36, Issue 7, 671-677.
Aguirre De Carcer et al. Active-Site Models for Iron Hydrogenases: Reduction Chemistry of Dinuclear Iron Complexes. Inorg. Chem., 2006, 45 (20), pp. 8000-8002.
Alongia et al. Caseins and hydrophobins as novel green flame retardants for cotton fabrics. Polymer Degradation and Stability vol. 99, Jan. 2014, pp. 111-117.
Beom-Young Ryu and Todd Emrick. Thermally Induced Structural Transformation of Bisphenol-1,2,3-triazole Polymers: Smart, Self-Extinguishing Materials. Angew. Chem. Int. Ed. 2010, 49, 9644-9647.
Laufer et al. Clay-Chitosan Nanobrick Walls: Completely Renewable Gas Barrier and Flame-Retardant Nanocoatings. ACS Appl. Mater. Interfaces 2012, 4, 1643-1649.
Laufer et al. Exceptionally Flame Retardant Sulfur-Based Multilayer Nanocoating for Polyurethane Prepared from Aqueous Polyelectrolyte Solutions. ACS Macro Lett., 2013, 2 (5), pp. 361-365.
Li et al. Intumescent All-Polymer Multilayer Nanocoating Capable of Extinguishing Flame on Fabric. Adv. Mater. 2011, 23, 3926-3931.

* cited by examiner

CHALCOGENIDE HYBRID INORGANIC/ORGANIC POLYMER (CHIP) MATERIALS AS IMPROVED CROSSLINKING AGENTS FOR VULCANIZATION

CROSS REFERENCE

This application is a continuation-in-part and claims benefit of U.S. patent application Ser. No. 16/622,875 filed Dec. 13, 2019, which is a 371 and claims benefit of International Application No. PCT/US2018/037598 filed Jun. 14, 2018, which claims priority to U.S. Provisional Patent Application No. 62/520,215 filed Jun. 15, 2017, the specifications of which are incorporated herein in their entirety by reference.

STATEMENT REGARDING FEDERALLY SPONSORED RESEARCH OR DEVELOPMENT

This invention was made with government support under Grant No. 1807395 awarded by NSF. The government has certain rights in the invention.

FIELD OF THE INVENTION

The present invention relates to vulcanization of natural and synthetic polymers using a vulcanizing agent comprising a high sulfur content polymer or Chalcogenide Hybrid Inorganic/organic Polymer (CHIP) material.

BACKGROUND OF THE INVENTION

Vulcanization of rubber and other polymeric materials is a well-established method for enhancing physical properties by chemical crosslinking. Vulcanized materials are generally more thermally, chemically, and physically robust than their non-vulcanized analogs. These increased characteristics are attributed to the formation of carbon-sulfur bonds which allow for bridging of the polymer chains by varying numbers of sulfur atoms to form crosslinked networks.

While the practice of vulcanization has expanded to include a variety of natural and synthetic polymer substrates, limitations and drawbacks of the method have also been identified. Vulcanization of rubbers by sulfur alone is an inefficient process. The chemical reaction between sulfur and the rubber occurs mainly at the C═C double bonds and each crosslink requires 40 to 55 sulfur atoms (in the absence of an accelerator). For example, FIG. 2C shows heterogeneous crosslinking due to poor sulfur miscibility. The long chain S—S can also re-organize during curing. The process of vulcanizing using only sulfur is uneconomical by today's production standards. The crosslinked materials thus produced are extremely prone to oxidative degradation and do not possess adequate mechanical properties for practical rubber applications.

These limitations have been partially overcome by use of accelerator additives in vulcanized rubber formulations. Such additives are known to increase the speed of vulcanization and to permit vulcanization to proceed at lower temperature and with greater efficiency. Despite the improvements afforded by accelerator additives, vulcanization still requires high temperatures and suffers from inefficient mixing of components due to poor incompatibility which results in incomplete curing and undesirable decomposition. Hence, there is a need for vulcanizing agents with improved polymer compatibility and lower-temperature curing.

An incredible abundance of elemental sulfur ($S_8$), nearly 7-million tons is generated as a waste byproduct from hydrodesulfurization of crude petroleum feedstocks, which converts alkanethiols and other (organo) sulfur compounds into $S_8$. Before the invention of the inverse vulcanization process, there were only a limited number of synthetic methods available to utilize and modify elemental sulfur. Current industrial utilization of elemental sulfur is centered around sulfuric acid, agrochemicals, and vulcanization of rubber. For example, elemental sulfur is used primarily for sulfuric acid and ammonium phosphate fertilizers, where the rest of the excess sulfur is stored as megaton-sized, above ground sulfur towers.

While sulfur feedstocks are plentiful, sulfur is difficult to process. In its original form, elemental sulfur consists of a cyclic molecule having the chemical formulation $S_8$. Elemental sulfur is a brittle, intractable, crystalline solid having poor solid state mechanical properties, poor solution processing characteristics, and there is a limited slate of synthetic methodologies developed for it. Hence, there is a need for the production of new materials that offer significant environmental and public health benefits to mitigate the storage of excess sulfur in powder, or brick form.

SUMMARY OF THE INVENTION

It is an objective of the present invention to provide for compositions and methods of vulcanization using chalcogenide hybrid inorganic/organic polymers (CHIP) materials, as specified in the independent claims. Embodiments of the invention are given in the dependent claims. Embodiments of the present invention can be freely combined with each other if they are not mutually exclusive.

In some aspects, the present invention may feature a vulcanized rubber composition prepared from a latex material and a vulcanizing agent comprising a CHIP material. In some embodiments, the vulcanizing agent may vulcanize the latex material to provide a crosslinked rubber.

The unique and inventive technical features of the present invention include the use of high sulfur content polymers, referred to as Chalcogenide Hybrid Inorganic/Organic Polymers (CHIP) materials, as a vulcanizing agent. The CHIP materials may comprise at least 45 wt % of chalcogenic monomers, and comonomers at a range of about 5-55 wt % of the CHIP material. In some embodiments, the comonomers co-polymerize with the chalcogenic monomers. In this invention, the physical and chemical properties of the CHIP's, such as compatibility with conventional polymers, variation of chalcogenic bonds, and crosslinking ability are optimized to allow the CHIP materials to act as superior vulcanizing agents. Without wishing to limit the invention to any theory or mechanism, it is believed that these technical features advantageously allow for vulcanization methods and compositions with better mixing and more complete and efficient crosslinking. None of the presently known prior references or work has the unique inventive technical feature of the present invention.

In one embodiment, elemental sulfur used in vulcanization is partially or completely replaced with a CHIP material or a vulcanizing agent comprising a CHIP material. The high sulfur content of the CHIP materials allows for formation of the same sulfur-bridging linkages of vulcanized polymer chains that are formed in traditional vulcanization. The chalcogen bonds in the CHIP materials may also be varied to introduce weaker bonds than those found in elemental sulfur and may result in crosslinking sulfur vulcanization agents that are effectively more accessible for crosslinking than in other sulfur sources such as elemental sulfur. The polymeric form of the CHIP materials also circumvents the known problem of elemental sulfur's general low solubility and incompatibility with polymers.

In some embodiments, the rubber may further comprise one or more additives. Non-limiting examples of additives include an accelerator, a peroxide, a plasticizer, an anti-ozonant, an antioxidant, a retarder, a lubricant, a filler, a colorant or a combination thereof. In yet another embodiment, the present invention may feature a method of vulcanizing a latex material to form a crosslinked rubber. In an embodiment, the method may comprise reacting said latex material with a CHIP material such that the CHIP material vulcanizes the latex material to provide said crosslinked rubber. As a non-limiting example, the method may be performed in a time of about 10 to 20 min and at a temperature of less than about 170° C.

In some embodiments, the latex material may be natural, synthetic, or a combination thereof and may comprise a natural rubber, a polydiene, a polydiene copolymer, polybutadiene, polyisoprene, polychloroprene, a butyl rubber, a silicone rubber latex, an acrylic rubber latex or a combination thereof. In other embodiments, the chalcogenic monomers may comprise sulfur monomers derived from elemental sulfur and elemental selenium (See) or be selected from a group consisting of elemental sulfur, a liquid polysulfide, an oligomer containing sulfur, and an oligomer containing sulfur and selenium units.

According to a preferred embodiment, the comonomers may be co-polymerized with the chalcogenic monomers via free radical polymerization, controlled radical polymerization, ring-opening polymerization, ring-opening metathesis polymerization, step-growth polymerization, or chain-growth polymerization. In further embodiments, the comonomers may be each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbomene monomers, monomers having at least one vinyl ether moiety, monomers having at least one isopropenyl moiety, monomers having at least one imidazole moiety, and monomers having at least one heterocyclic moiety.

According to another embodiment, the CHIP material may comprise chalcogenic bonds which are weaker than an S—S bond in elemental sulfur. In an embodiment, the chalcogenic bonds may break with the application of heat or a catalyst to generate one or more radical species which may react with said latex material. In some embodiments, the CHIP material may further comprise one or more second comonomers.

In one embodiment, the CHIP material may comprise one or more reactive functional groups. These functional groups may be capable of activating one or more chalcogen bonds to accelerate vulcanization or of accelerating a breaking of one or more chalcogen bonds. In some embodiments, the functional groups may be nucleophilic functional groups. In other embodiments, the functional groups may be amine, N-heterocyclic, phosphine, or sulfide functional groups.

According to some embodiments, the vulcanizing agent may comprise a chalcogenic hybrid inorganic/organic polymer (CHIP) material comprising one or more chalcogenic monomers at a level of at least 45 wt % of the CHIP material, and a comonomer at a level in the range of about 5-55 wt % of the CHIP material. In some embodiments, the chalcogenic monomers may comprise elemental sulfur, a liquid polysulfide, an oligomer containing sulfur, an oligomer containing sulfur and selenium units, cyclic selenium sulfides, or monomers derived from elemental sulfur and elemental selenium ($Se_8$). In some embodiments, the comonomer may be diisopropenylbenzene monomer, a norbornene monomer, a norbornadiene monomer, or a derivative thereof.

In other embodiments, the CHIP material may further comprise a termonomer at a level in the range of about 5-45 wt % of the CHIP material. In some embodiments, the termonomer co-polymerizes with the one or more chalcogenic monomers, the comonomer, or both. In some embodiments, the termonomer is different from the comonomer. In some embodiments, the termonomer is an activated arene, a vinylic amine, an N-heterocycle, a cyclic olefin, afunctional olefin with a polar or nucleophilic side chain group, a norbornene monomer, a norbornadiene monomer, a norbornene or norbomadiene derivative, a vinylaniline, or a phenylenediamine.

In this invention, it is surprisingly discovered that the use of a high content sulfur polymer instead of elemental sulfur as a vulcanizing agent surprisingly allows for a higher crosslinking efficiency vulcanization without the use of a separate accelerator additive. In this invention, the CHIP materials are tuned to have good polymer compatibility or solubility in a number of polymers. Furthermore, CHIP materials may be specially selected to provide for a lower temperature vulcanization. The CHIP materials of the present invention are suitable for use as vulcanizing agents because their composition and reactivity are specially tuned via the inverse vulcanization polymerization of sulfur with functional organic comonomers. The innovative combination of appropriate comonomers improves miscibility with liquid polydienes and introduces nucleophilic groups to accelerate crosslinking. FIG. 2D is a non-limiting example of the target microstructure that demonstrates the idealized crosslinking density.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1A:
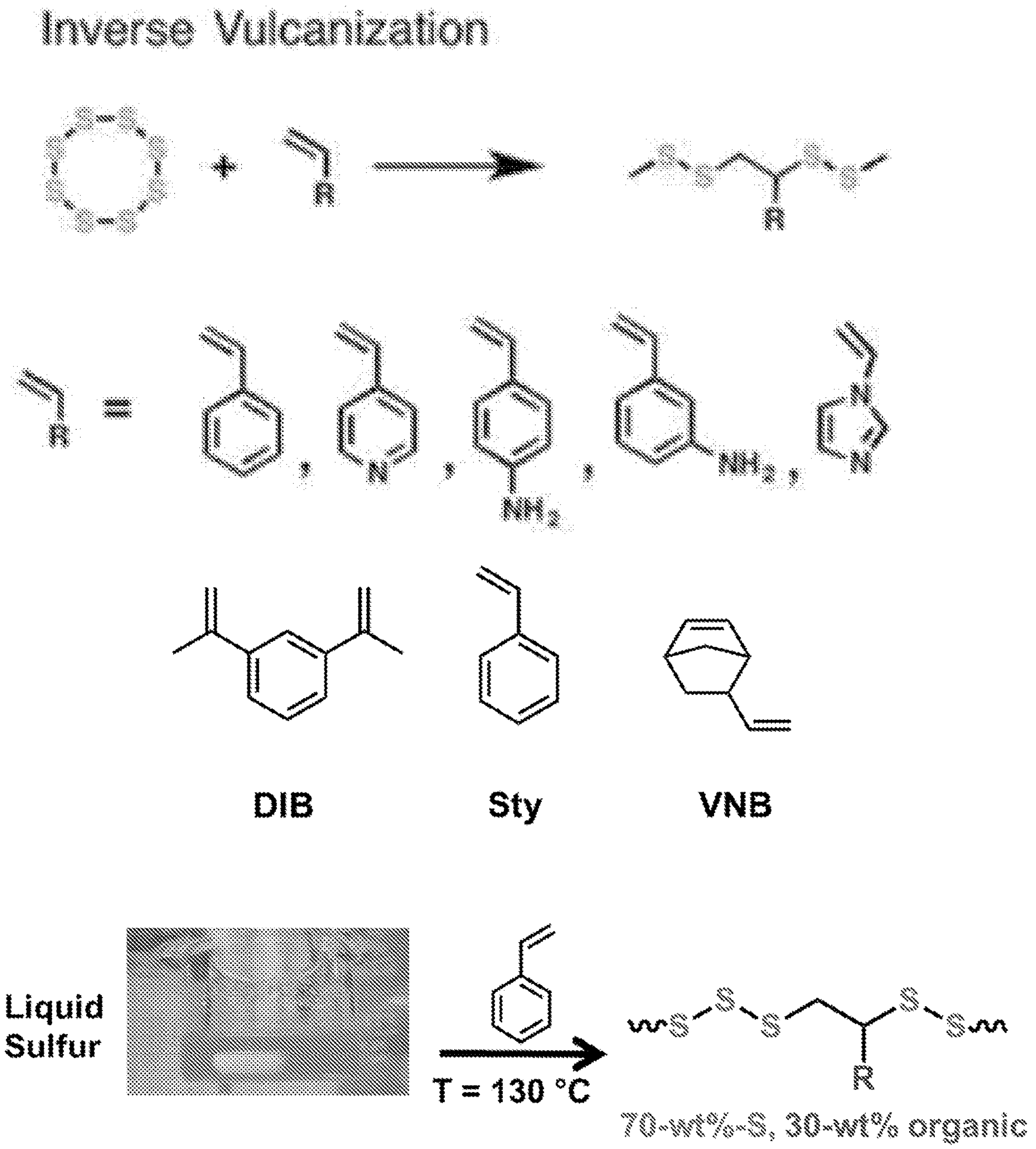
FIG. 1A shows a non-limiting schematic of inverse vulcanization using vinylic comonomers.

As used herein, sulfur can be provided as elemental sulfur, for example, in powdered form. Under ambient conditions, elemental sulfur primarily exists in an eight-membered ring form (S8) which melts at temperatures in the range of 120° C.-130° C. and undergoes an equilibrium ring-opening polymerization (ROP) of the S8 monomer into a linear polysulfane with diradical chain ends. As the person of skill in the art will appreciate, while S8 is generally the most stable, most accessible and cheapest feedstock, many other allotropes of sulfur can be used (such as other cyclic allotropes, derivable by melt-thermal processing of S8). Any sulfur species that yield diradical or anionic polymerizing species when heated as described herein can be used in practicing the present invention.

As used herein, a "CHIP material" is a material comprising one or more chalcogenide hybrid inorganic/organic polymers. As a non-limiting example, a CHIP material may comprise a copolymer prepared by the copolymerization of one or more chalcogenide monomers with one or more comonomers.

As used herein, a "styrenic comonomer" is a monomer that has a vinyl functional group. The styrenic comonomer may comprise a styrene and at least one reactive functional group. As known to one of ordinary skill in the art, a styrene is a derivative of benzene ring that has a vinylic moiety. The sulfur diradicals can link to the vinylic moieties of the styrenic commoners to form the sulfur-styrenic polymer. In certain embodiments, the reactive functional group may be a halogen, an alkyl halide, an alkyl, an alkoxy, an amine, or a nitro functional group. Non-limiting examples of styrenic comonomers include bromostyrene, chlorostyrene, fluorostyrene, (trifluoromethyl)styrene, vinylaniline, acetoxystyrene, methoxystyrene, methoxystyrene, methylstyrene, nitrostyrene, vinylbenzoic acid, vinylanisole, and vinylbenzyl chloride.

As used herein, the term "amine monomer" is a monomer that has an amine functional group. In one embodiment, aromatic amines and multi-functional amines may be used. Amine monomers include, but are not limited to, aromatic amines, m-phenylenediamine, and p-phenylenediamine. The various types of phenylenediamines are inexpensive reagents due to their wide-spread use in the preparation of many conventional polymers, e.g., polyureas, polyamides As used herein, the term "thiol monomer" is a monomer that has a thiol functional group. Thiol monomers include, but are not limited to, 4,4'-thiobis benzenethiol and the like. The term "sulfide monomers" are monomers that have sulfide functional groups.

As used herein, an alkynylly unsaturated monomer is a monomer that has an alkynylly unsaturated functional group (i.e. triple bond). The term "alkynylly unsaturated monomer" does not include compounds in which the alkynyl unsaturation is part of a long chain alkyl moiety (e.g., unsaturated fatty acids, or carboxylic salts, or esters such as oleates, and unsaturated plant oils). In one embodiment, aromatic alkynes, both internal and terminal alkynes, multi-functional alkynes may be used. Examples of alkynylly unsaturated monomers include, but are not limited to, ethynylbenzene, 1-phenylpropyne, 1,2-diphenylethyne, 1,4-diethynylbenzene, 1,4-bis(phenylethynyl) benzene, and 1,4-diphenylbuta-1,3-diyne.

As used herein, the term "nitrone monomer" is a monomer that has a nitrone groups. In one embodiment, nitrones, dinitrones, and multi-nitrones may be used. Examples include, but are not limited to, N-benzylidene-2-methylpropan-2-amine oxide. As used herein, the term "aldehyde monomer" is a monomer that has an aldehyde functional group. In one embodiment, aldehydes, dialdehydes, and multi-aldehydes may be used. As used herein, the term "ketone monomer" is a monomer that has a ketone functional group. In one embodiment, ketones, di-ketones, and multi-ketones may be used.

As used herein, the term "epoxide monomer" is a monomer that has epoxide functional groups. Non-limiting examples of such monomers include, generally, mono- or polyoxiranylbenzenes, mono- or polyglycidylbenzenes, mono- or polyglycidyloxybenzenes, mono- or polyoxiranyl (hetero)aromatic compounds, mono- or polyglycidyl(hetero) aromatic compounds, mono- or polyglycidyloxy(hetero)aromatic compounds, diglycidyl bisphenol A ethers, mono- or polyglycidyl(cyclo)alkyl ethers, mono- or polyepoxy(cyclo) alkane compounds and oxirane-terminated oligomers. In one preferred embodiment, the epoxide monomers may be benzyl glycidyl ether and tris(4-hydroxyphenyl)methane triglycidyl ether. In certain embodiments, the epoxide monomers may include a (hetero)aromatic moiety such as, for example, a phenyl, a pyridine, a triazine, a pyrene, a naphthalene, or a polycyclic (hetero)aromatic ring system, bearing one or more epoxide groups. For example, in certain embodiments, the one or more epoxide monomers are selected from epoxy(hetero)aromatic compounds, such as styrene oxide and stilbene oxide and (hetero)aromatic glycidyl compounds, such as glycidyl phenyl ethers (e.g., resorcinol diglycidyl ether, glycidyl 2-methylphenyl ether), glycidylbenzenes (e.g., (2,3-epoxypropyl)benzene) and glycidyl heteroaromatic compounds (e.g., N-(2,3-epoxypropyl)phthalimide). In certain desirable embodiments, an epoxide monomer will have a boiling point greater than 180° C., greater than 200° C., or even greater than 230° C. at the pressure at which polymerization is performed (e.g., at standard pressure, or at other pressures).

As used herein, the term "thiirane monomer" is a monomer that has a thirane functional group. Non-limiting examples of thiirane monomers include, generally, mono- or polythiiranylbenzenes, mono- or polythiiranylmethylbenzenes, mono- or polythiiranyl(hetero)aromatic compounds, mono- or polythiiranylmethyl(hetero)-aromatic compounds, dithiiranylmethyl bisphenol A ethers, mono- or polydithiiranyl (cyclo)alkyl ethers, mono- or polyepisulfide(cyclo) alkane compounds, and thiirane-terminated oligomers. In some embodiments, thiirane monomers may include a (hetero)aromatic moiety such as, for example, a phenyl, a pyridine, a triazine, a pyrene, a naphthalene, or a poly cyclic (hetero)aromatic ring system, bearing one or more thiirane groups. In certain desirable embodiments, a thiirane monomer can have a boiling point greater than 180° C., greater than 200° C., or even greater than 230° C. at the pressure at which polymerization is performed (e.g., at standard pressure).

As used herein, an ethylenically unsaturated monomer is a monomer that contains an ethylenically unsaturated functional group (i.e. double bond). The term "ethylenically unsaturated monomer" does not include cyclopentadienyl species such as cyclopentadiene and dicyclopentadiene. The term "ethylenically unsaturated monomer" does not include compounds in which the ethylenic unsaturation is part of a long chain alkyl moiety (e.g. unsaturated fatty acids such as oleates, and unsaturated plant oils).

Non-limiting examples of ethylenically unsaturated monomers include vinyl monomers, acryl monomers, (meth)acryl monomers, unsaturated hydrocarbon monomers, and ethylenically-terminated oligomers. Examples of such monomers include, generally, mono- or polyvinylbenzenes, mono- or polyisopropenylbenzenes, mono- or polyvinyl(hetero)aromatic compounds, mono- or polyisopropenyl(hetero)-aromatic compounds, acrylates, methacrylates, alkylene di(meth)acrylates, bisphenol A di(meth)acrylates, benzyl (meth)acrylates, phenyl(meth)acrylates, heteroaryl (meth)acrylates, terpenes (e.g., squalene) and carotene. In other embodiments, the ethylenically unsaturated monomers may include a (hetero)aromatic moiety such as, for example, phenyl, pyridine, triazine, pyrene, naphthalene, or a polycyclic (hetero)aromatic ring system, bearing one or more vinylic, acrylic or methacrylic substituents. Examples of such monomers include benzyl (meth)acrylates, phenyl (meth)acrylates, divinylbenzenes (e.g., 1,3-divinylbenzene, 1,4-divinylbenzene), isopropenylbenzene, styrenics (e.g., styrene, 4-methylstyrene, 4-chlorostyrene, 2,6-dichlorostyrene, 4-vinylbenzyl chloride), diisopropenylbenzenes (e.g., 1,3-diisopropenylbenzene), vinylpyridines (e.g., 2-vinylpyridine, 4-vinylpyridine), 2,4,6-tris((4-vinylbenzyl)thio)-1,3,5-triazine and divinylpyridines (e.g., 2,5-divinylpyridine). In certain embodiments, the ethylenically unsaturated monomers (e.g., including an aromatic moiety) bear an amino (i.e., primary or secondary) group, a phosphine group or a thiol group. One example of such a monomer is vinyldiphenylphosphine. In certain desirable embodiments, an ethylenically unsaturated monomer will have a boiling point greater than 180° C., greater than 200° C., or even greater than 230° C. at the pressure at which polymerization is performed (e.g., at standard pressure).

As used herein, an "olefin" refers to acyclic and/or cyclic compounds that have one or more double bonds. In some embodiments, the olefins may be hydrocarbons. In other embodiments, the olefins may be functional olefins having side groups. In a non-limiting embodiment, the side groups may be polar or nucleophilic side chain groups, such as an alcohol group or amine group. Non-limiting examples of such include undecen-ol, buten-ol, hexen-ol, etc.

In other embodiments, the olefins may be cyclic olefin comonomers that include, but are not limited to, cyclopentadiene, cyclohexene, norbornene, norbornadiene, or derivatives thereof. As known to one of ordinary skill in the art, norbornene is a cyclic alkene with a dense three-dimensional structure: a cyclohexene ring with a bridging methylene in the para-position. In some preferred embodiments, the comonomers are norbomenes, norbornadienes, or norbornene or norbornadiene derived strained cyclic comonomers. In some embodiments, the norbomenes or norbornadienes may have a functional group, or tethered to a group, such as a vinyl, an alcohol, a carboxylic acid, an aromatic complex, or a nitrogen or sulfur containing moiety.

As used herein, the term "functional" in correlation with a polymer refers to functional polymers that have specified physical, chemical, biological, pharmacological, or other properties or uses that are determined by the presence of specific chemical functional groups, which are usually dissimilar to those of the backbone chain of the polymer.

As used herein, the term "chalcogenide" refers to a compound containing one or more chalcogen elements. One of ordinary skill in the art will understand that the classical chalcogen elements are sulfur, selenium and tellurium. In accordance with the present invention, the use of chalcogenide refers to compounds and/or polymers containing sulfur, selenium, or a combination thereof. Other chalcogenide precursors include, but are not limited to, cyclic selenium sulfides and combinations of $S_8$ and elemental selenium, such as grey Se or red Se.

As used herein, the term "chalcogenic bond" refers to a bond to one or two chalcogen elements. Non-limiting examples include an S—S bond, a Se—Se bond, a S—Se bond, a S—C bond, a Se—C bond, a S—O bond, a Se—O bond, a S—H bond, a Se—H bond, a S—N bond or a Se—N bond.

As known to one of ordinary skill in the art, the term "isomer" refers to compounds having the same formula but differ in arrangement. For instance, isomers of cyclic selenium sulfides, such as $Se_2S_6$ and $Se_3S_5$, can have different placements of the Se units in the ring (e.g., S—Se—Se—S or S—Se—S). Isomers of $Se_2S_6$ include 1,2-isomers, 1,3-isomers, 1,4-isomers, and 1,5-isomers, wherein the numbers refer to the position of the Se units in the eight-membered ring.

As used herein, the term "vulcanize" refers to a process by which one or more polymers are chemically crosslinked by reaction with a vulcanizing agent. As used herein, the term "vulcanizing agent" refers to a compound which can be used to chemically crosslink one or more polymers, such as, for example, natural or synthetic latex. As known to one of ordinary skill in the art, the term "vulcanizate" refers to a substance that has undergone vulcanization, i.e., a vulcanized substance.

As known to one of ordinary skill in the art, the term "latex" refers to any polymer in a water-based liquid or viscous state. As used herein, the term "latex" refers to one or more polymers which can be vulcanized.

In one embodiment, a CHIP material possessing properties allowing it to function as a vulcanizing agent may be prepared. For example, a CHIP material with enhanced polymer compatibility, reactive chalcogenic bonds, and efficient crosslinking ability may be prepared.

According to a preferred embodiment, the present invention may feature a vulcanizing agent comprising a CHIP material. In some embodiments, said CHIP material may comprise one or more chalcogenic monomers at a level of at least 45 wt % of the CHIP material, and one or more comonomers each having a reactive functional group, at a level in the range of about 5-55 wt % of the CHIP material, where the one or more comonomers are co-polymerized with the chalcogenic monomers. In other embodiments, said CHIP material may comprise one or more chalcogenic monomers at a level of at least 46, 47, 48, 49 or 50 wt % of the CHIP material, and one or more comonomers, at a level in the range of about 5-54, 5-53, 5-52, 5-51 or 5-50 wt % of the CHIP material. Any of the listed ranges for the chalcogenic monomers may be combined with any of the listed ranges for the comonomers.

According to some embodiments, the comonomers may be each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, monomers having at least one isopropenyl moiety, monomers having at least one imidazole moiety, and monomers having at least one heterocyclic moiety. In further embodiments, the chalcogenic monomers may be selected from a group consisting of elemental sulfur, a liquid polysulfide, an oligomer containing sulfur, an oligomer containing sulfur and selenium units, sulfur monomers derived from elemental sulfur, and elemental selenium.

In some embodiments, the present invention may comprise methods of vulcanizing a latex material to form a crosslinked rubber. A non-limiting example is a method comprising providing said latex material, providing a CHIP material, mixing said latex material and said CHIP material, and heating the mixed latex material and CHIP material at a temperature and for a period of time sufficient to effect vulcanization of the latex material. Without wishing to limit the invention to a particular theory or mechanism, the CHIP material may vulcanize the latex material to provide said crosslinked rubber.

According to some embodiments, the latex material may be a natural or synthetic material or a combination thereof. Non-limiting examples include a natural rubber, a polydiene, a polydiene copolymer, polybutadiene, polyisoprene, polychloroprene, a butyl rubber, a poly(styrene-butadiene-styrene) (SBS) rubber, a silicone rubber latex, an acrylic rubber latex, naturally sourced polyenes, or a combination thereof.

Figure 2A:
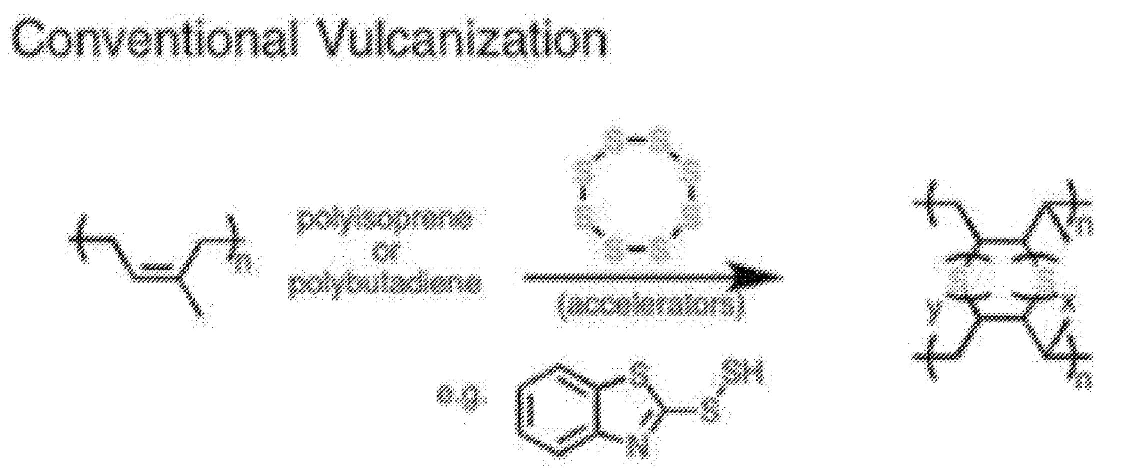
FIG. 2A shows a reaction scheme of conventional vulcanization using elemental sulfur.
Figure 2B:
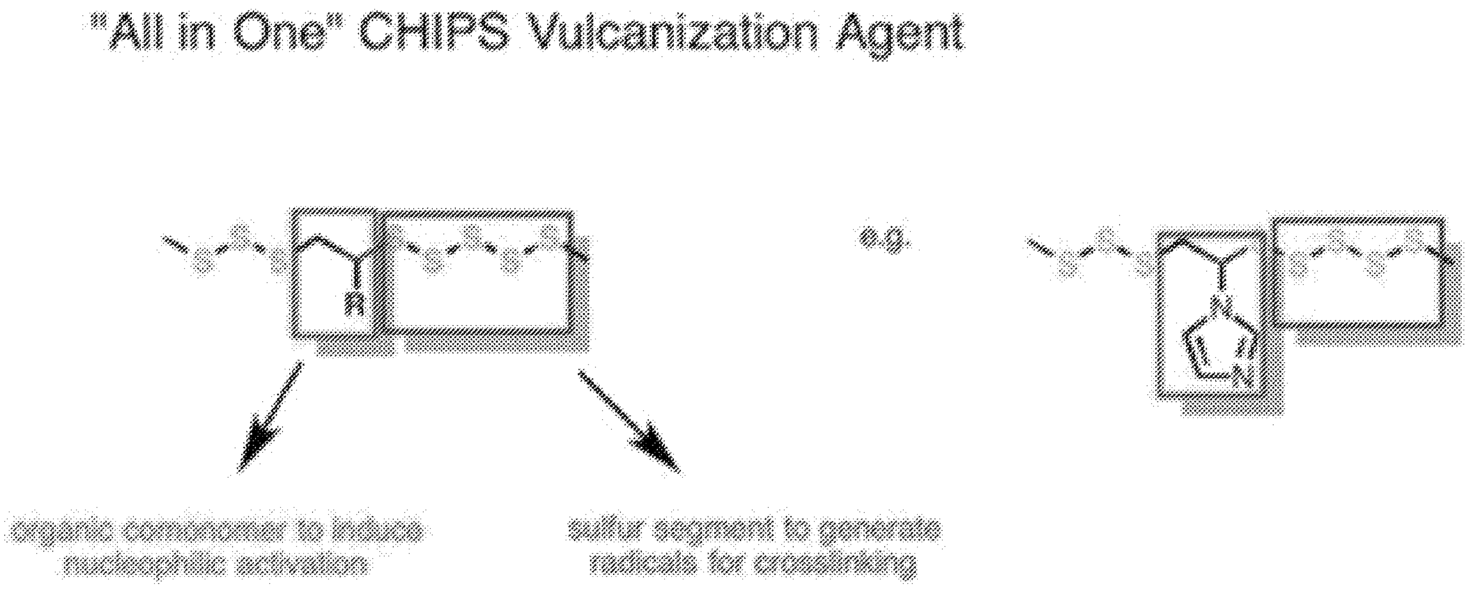
FIG. 2B shows a non-limiting example of a CHIP vulcanization agent of the present invention.
Figure 2C:
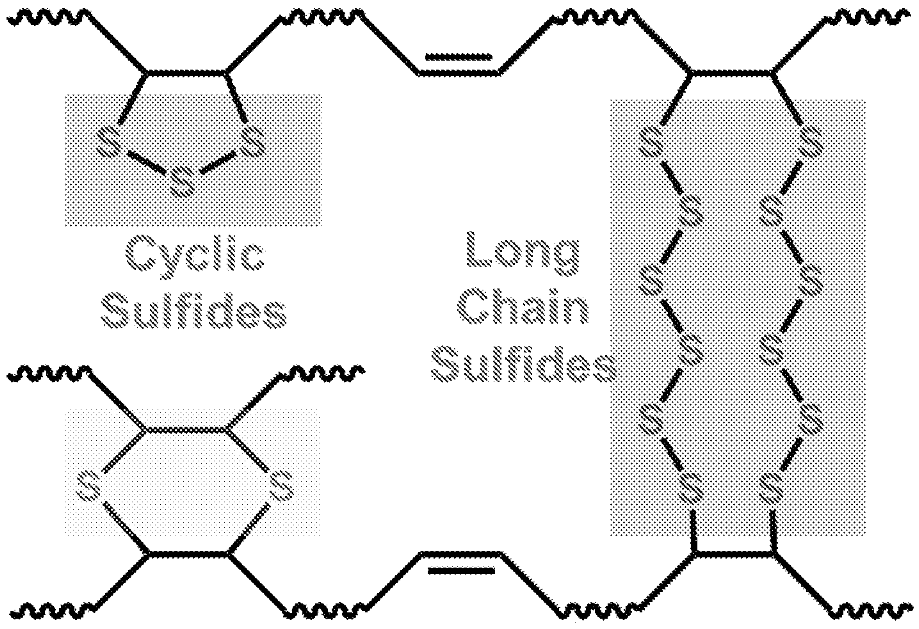
FIG. 2C depicts the current limitations of vulcanization chemistry, such as heterogeneous crosslinking due to poor sulfur miscibility and long chain S—S's that can reorganize during curing.
Figure 2D:
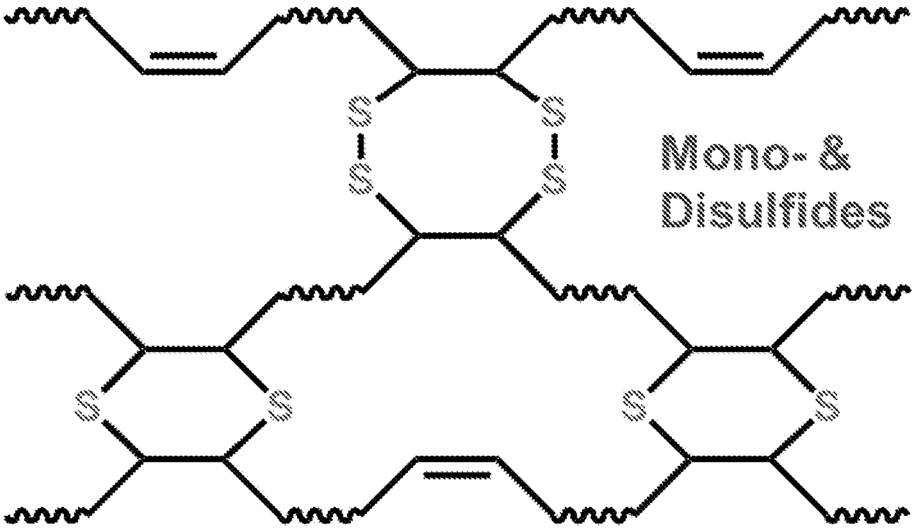
FIG. 2D shows a target microstructure having an idealized crosslinking density according to a non-limiting embodiment of the present invention.

Referring to FIG. 2B, in preferred embodiments, the CHIP material may comprise chalcogenic bonds, where said chalcogenic bonds are weaker than an S—S bond in elemental sulfur. Without wishing to limit the invention to a particular theory or mechanism, the CHIP material may comprise chalcogenic bonds that are breakable and may generate one or more radical species that can react with a latex material. For example, the radical species contain a sulfur chain segment that may function as a crosslinker. In some embodiments, the chalcogenic bonds may break with the application of heat and/or catalyst or by photochemical degradation.

Figure 1B:
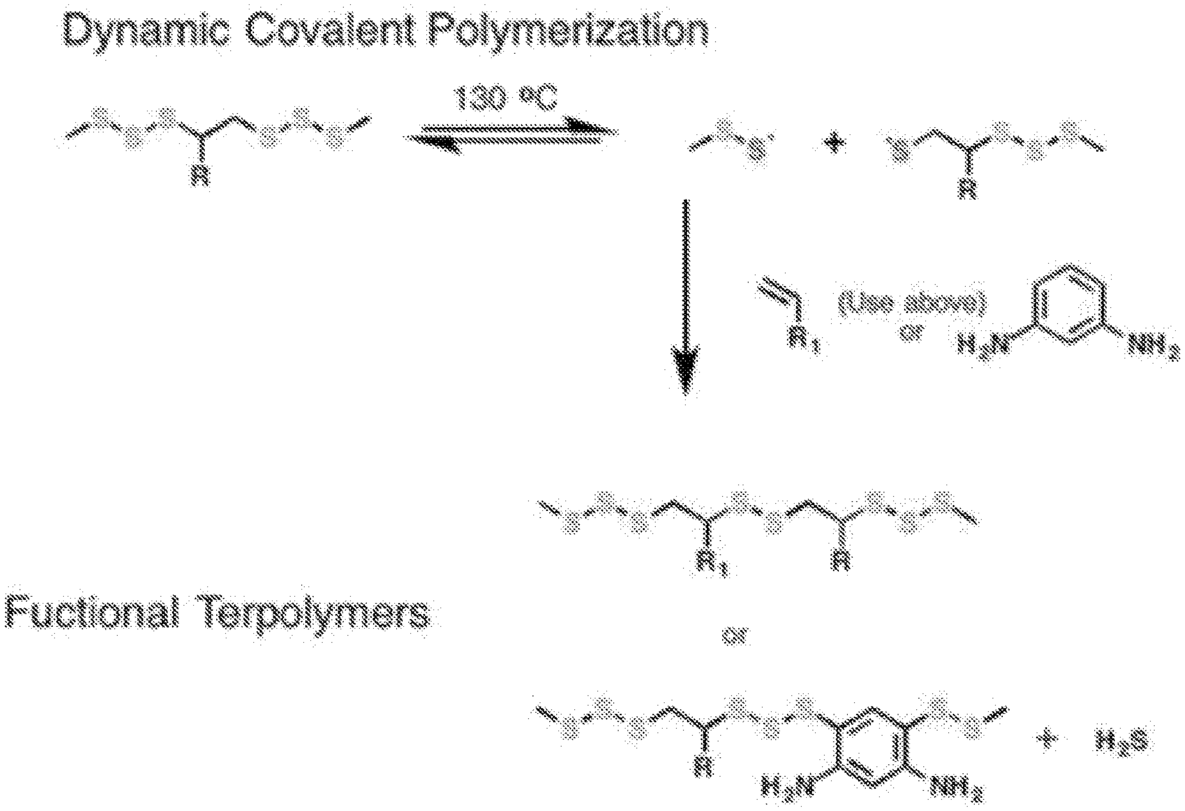
FIG. 1B shows a non-limiting schematic of inverse vulcanization to form functional terpolymers.
Figure 1C:
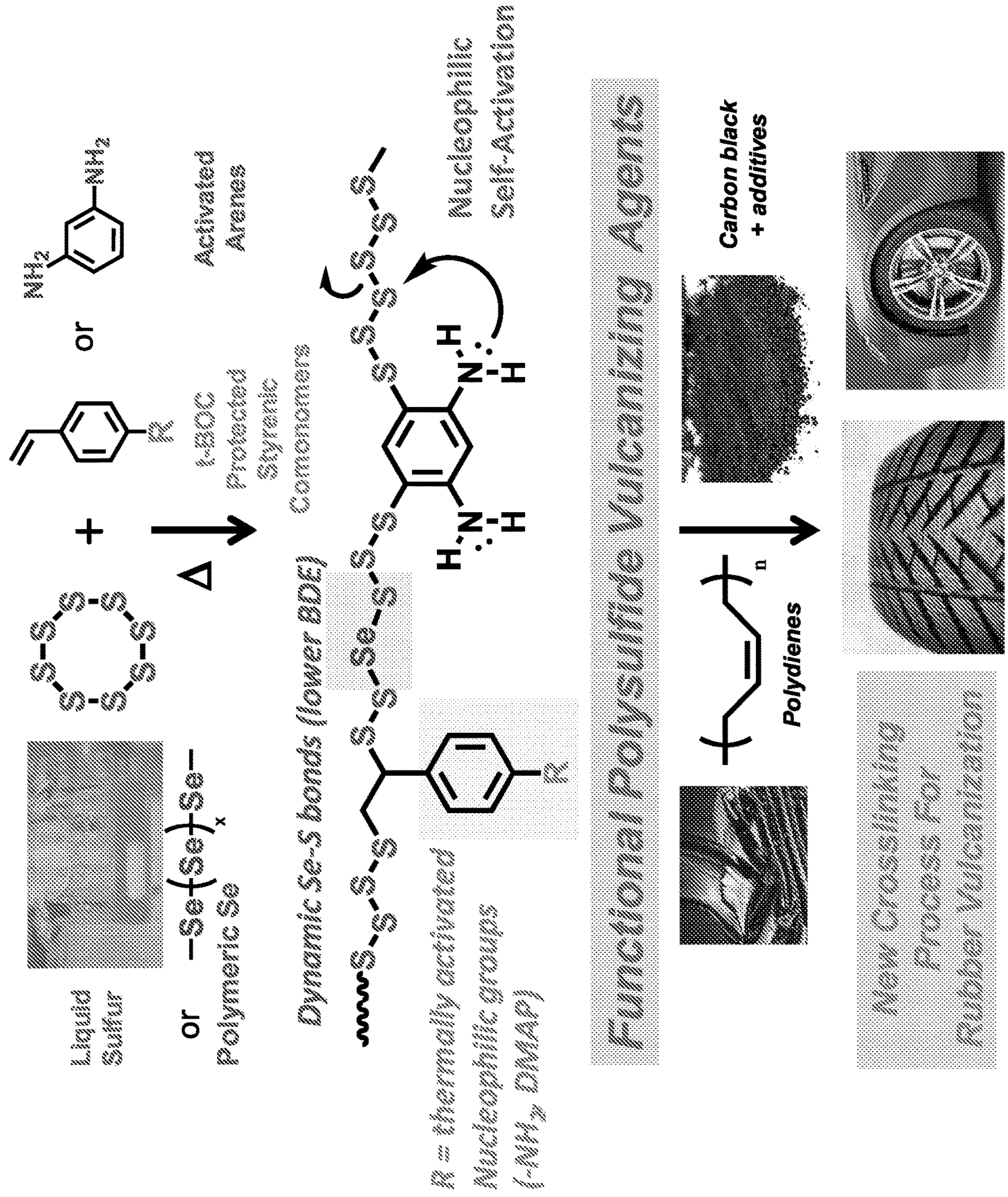
FIG. 1C shows a non-limiting schematic of inverse vulcanization to form functional polysulfide vulcanizing agents.

Referring to FIGS. 1B and 2B, in other embodiments, the CHIP material may comprise functional groups that can accelerate the breaking of chalcogenic bonds. As a non-limiting example, the CHIP material may comprise an unsaturated comonomer with a functional group that can act as a vulcanization accelerator. For example, the functional group may be nucleophilic and able to activate sulfur or chalcogen bonds. As a non-limiting example, the functional group may be an amine or N-heterocyclic, phosphine, or sulfide functional group. Without wishing to limit the invention to a particular theory or mechanism, while the chalcogenic monomers are polymerized with the one or more comonomers, and in some embodiments, with additional second comonomers, a functional group of the comonomers is maintained through the polymerization reaction such that the CHIP material contains said functional group originating from the comonomers. Hence, as shown in FIG. 2B, the CHIP material contains within itself the functional group which can function as a vulcanizing accelerator by attacking and breaking the chalcogenic bonds. Unlike the conventional vulcanization, where small molecule accelerators are added into a complex vulcanization formula, the CHIP material can function as both a vulcanizing agent and a vulcanizing accelerator.

In one embodiment, the present invention may feature a curable elastomeric composition comprising a latex material and a CHIP material. Without wishing to limit the invention to a particular theory or mechanism, the CHIP material can vulcanize the latex material to provide a crosslinked rubber. In further embodiments, the curable elastic composition may comprise one or more additives. Non-limiting examples of additives include, an accelerator, a peroxide, a plasticizer, an antioxidant, a retarder, a lubricant, a filler, a colorant or a combination thereof.

In another embodiment, the present invention may feature a vulcanized rubber composition. For example, a vulcanized rubber composition may be prepared from a latex material and a vulcanizing agent which comprises a CHIP material. Without wishing to limit the invention to a particular theory or mechanism, the CHIP material can vulcanize the latex material to provide a crosslinked rubber. In further embodiments, the vulcanized rubber composition may comprise one or more additives. Non-limiting examples of additives include, an accelerator, a peroxide, a plasticizer, an antiozonant, an antioxidant, a retarder, a lubricant, a filler, a colorant or a combination thereof.

For example, in a non-limiting embodiment, the filler may be carbon black or carbon based fillers. Without wishing to limit the present invention to a particular theory or mechanism, the comonomer or comonomer and termonomer can improve miscibility of the CHIP material to carbon black or carbon based fillers. In some embodiments, the comonomer and/or termonomer may comprise DIB or styrenic comonomer formulations.

In some embodiments, the CHIP material is formulated to have a desired thermomechanical property. For example, in one embodiment, the CHIP material may be formulated to possess higher glass transition temperatures ($T_g$) to achieve powder form. In another non-limiting embodiment, the CHIP material may be formulated to possess a lower $T_g$ to access a liquid form to aid in miscibility and formulation with the rubber phase.

In another embodiment, the present invention may feature a tire having a tread comprising any of the vulcanized rubber compositions described herein. For example, the present invention may feature a tire having a tread comprising a rubber composition which has been vulcanized using a CHIP material. In other embodiments, the present invention may feature a tire having a sidewall or entire composition comprising any of the vulcanized rubber compositions described herein.

In another embodiment, the present invention may feature a rubber substrate comprising any of the vulcanized rubber compositions described herein. For example, the present invention may feature a rubber substrate comprising a rubber composition which has been vulcanized using a CHIP material. Non-limiting examples of rubber substrates include a gasket, belt, hose, mat, flooring material, weatherstrip, windshield wiper, boot, automotive part, shoe material, stopper, barrier, insulator, medical device, stamp, balloon, eraser, ball, suit, glove, boat, flotation device, shock absorber, or vibration absorber.

According to some embodiments, any of the CHIP material described herein may further comprise one or more second comonomers. In some embodiments, the one or more second comonomers are selected from a group consisting of a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, and a styrenic monomer. In other embodiments, the second monomers are at a level of about 2 to about 55 wt %, or about 2 to about 10 wt %, or about 10 to about 20 wt %, or about 20 to about 30 wt %, or about 30 to about 40 wt %, or about 40 to about 55 wt % of the CHIP material In one embodiment, any one of the CHIP materials described herein may comprise one or more cyclic selenium sulfide monomers having the formula $Se_nS_{(8-n)}$, and one or more comonomers selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbomene monomers, monomers having at least one vinyl ether moiety, monomers having at least one isopropenyl moiety, monomers having at least one imidazole moiety, and monomers having at least one heterocyclic moiety. In one embodiment, the comonomers are at a level in the range of about 5-55 wt % of the CHIP material. In another embodiment, the cyclic selenium sulfide monomers comprise at most about 70 wt % of selenium, and can include any isomer of the formula.

In some embodiments, n in an integer that can range from 1 to 7. For example, when n=2, the cyclic selenium sulfide monomers have the formula $Se_2S_6$. As another example, when n=3, the cyclic selenium sulfide monomers have the formula $Se_3S_5$. Preferably, the one or more cyclic selenium sulfide monomers can comprise all possible isomers of a specific formula. In alternative embodiments, the selenium sulfide monomers can be of the formula $Se_nS_m$, wherein n ranges from 1 to 7 and m ranges from 1 to 7, wherein the selenium sulfide monomers are not necessarily cyclic. In one embodiment, assuming that n=7, i.e. $Se_7S$, then the cyclic selenium sulfide monomers may comprise at most about 70 wt % of selenium.

In some embodiments, the cyclic selenium sulfide monomers are polymerized with the one or more comonomers via free radical polymerization, controlled radical polymerization, ring-opening polymerization, ring-opening metathesis polymerization, step-growth polymerization, or chain-growth polymerization. In preferred embodiments, polymerizing the comonomers with the selenium sulfide enables at least one functional sulfur moiety of the selenium sulfide to bond with at least one functional moiety of the one or more monomers. In some embodiments, the CHIP material may further comprise one or more comonomers which react to form a terpolymer.

In one embodiment, the CHIP material may comprise one or more cyclic selenium sulfide monomers at a range of about 5 to 10 wt %, or about 10 to 20 wt %, or about 20 to 30 wt %, or about 30 to 40 wt %, or about 40 to 50 wt %, or about 50 to 60 wt %, or about 60 to 70 wt % of the CHIP material. In another embodiment, the cyclic selenium sulfide monomers may comprise selenium units of at most about 20 wt %, or at most about 30 wt %, or at most about 40 wt % or at most about 50 wt %, or at most about 60 wt %, or at most about 70 wt % of the cyclic selenium sulfur monomers. In a further embodiment, the cyclic selenium sulfide monomers comprise at most about 70 wt % of selenium. In some embodiments, the one or more comonomers are at a range of about 5 to 10 wt %, or about 10 to 20 wt %, or about 20 to 30 wt %, or about 30 to 40 wt %, or about 40 to 50 wt % of the CHIP material.

In other embodiments, the CHIP material may further comprise about 5-55 wt % of elemental sulfur ($S_8$). In other embodiments, the elemental sulfur can be at a range of about 5 to 10 wt %, or about 10 to 20 wt %, or about 20 to 30 wt %, or about 30 to 40 wt %, or about 40 to 55 wt % of the CHIP material.

In still other embodiments, the CHIP material may further comprise about 5-55 wt % of elemental selenium ($Se_8$). In further embodiments, the elemental selenium can be at a range of about 5 to 10 wt %, or about 10 to 20 wt %, or about 20 to 30 wt %, or about 30 to 40 wt %, or about 40 to 55 wt % of the CHIP material. For instance, the CHIP material may comprise 30 wt % S, 35 wt % cyclic selenium-sulfide, and 35 wt % 1,3 diisopropenyl benzene.

According to another embodiment, the CHIP material may comprise one or more sulfur monomers derived from elemental sulfur, at a level of at least 35 wt % of the CHIP material, elemental selenium ($Se_8$) at a level of at least 35 wt % of the CHIP material, and one or more, at a level in the range of about 5-55 wt % of the CHIP material. In yet another embodiment the comonomers may be each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, monomers having at least one isopropenyl moiety, monomers having at least one imidazole moiety, and monomers having at least one heterocyclic moiety.

In one embodiment, the CHIP material may comprise at least about 55 wt % sulfur monomers. In another embodiment, the CHIP material may comprise at least about 55 wt % of $Se_8$. In an exemplary embodiment, the CHIP material may comprise about 35-55 wt % of sulfur monomers, about 35-55 wt % of elemental selenium, and about 15-25 wt % of the comonomers, such as diisopropenylbenzene.

According to another embodiment, the CHIP material may comprise one or more sulfur monomers derived from elemental sulfur at a level of at least 35% wt of the CHIP material, and one or more comonomers, at a level in the range of about 5-45 wt % of the CHIP material. In yet another embodiment the comonomers may be each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, monomers having at least one isopropenyl moiety, monomers having at least one imidazole moiety, and monomers having at least one heterocyclic moiety.

In some embodiments, the CHIP material comprises at least about 55 wt % sulfur monomers. In other embodiments, the one or more comonomers are at a range of about 5 to 10 wt %, or about 10 to 20 wt %, or about 20 to 30 wt %, or about 30 to 40 wt %, or about 40 to 45 wt % of the CHIP material. In still other embodiments, the CHIP material may further comprise at least about 35 wt %, or at least about 40 wt %, or at least about 55 wt % of elemental selenium.

In some embodiments, the chalcogenic monomers are polymerized with the one or more comonomers via free radical polymerization, controlled radical polymerization, ring-opening polymerization, ring-opening metathesis polymerization, step-growth polymerization, or chain-growth polymerization. In preferred embodiments, polymerizing the comonomers with the sulfur monomers enables at least one functional sulfur moiety of the sulfur monomers to bond with at least one functional moiety of the one or more monomers.

In yet other embodiments, the CHIP material may further comprise one or more termonomers. In some embodiments, the termonomers may be a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. The termonomers may be present in an amount ranging from about 5 to 45 wt % of the CHIP material.

In still other embodiments, the CHIP material may further comprise one or more polyfunctional monomers, such as for example, a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, or a polyethylenically unsaturated monomer. The polyfunctional monomers may be present in an amount ranging from about 5 to 45 wt % of the CHIP material.

The CHIP material can be made, for example, by polymerization of a molten mixture of chalcogenic monomers with the comonomers. Thus, in one aspect, the invention provides a method for making the CHIP material as described above. The method includes heating a mixture of the chalcogenic monomers and the one or more monomers together at a temperature sufficient to initiate polymerization (i.e., through free radical polymerization, through anionic polymerization, or through both, depending on the monomers used). For example, elemental sulfur, elemental selenium, selenium sulfide, or combinations thereof are polymerized with the comonomers. For example, in one embodiment, the method includes heating the mixture to a temperature in the range of about 120° C. to about 230° C., e.g., in the range of about 160° C. to about 230° C. The person of skill in the art will select conditions that provide the desired level of polymerization. In certain embodiments, the polymerization reaction is performed under ambient pressure. However, in other embodiments, the polymerization reaction can be performed at elevated pressure (e.g., in a bomb or an autoclave). Elevated pressures can be used to polymerize more volatile monomers, so that they do not vaporize under the elevated temperature reaction conditions.

In certain embodiments, it can be desirable to use a nucleophilic viscosity modifier in liquefying the chalcogenic monomers, for example, before adding one or more of the monomers (e.g., before adding any polyfunctional monomer). For example, in certain embodiments, the chalcogenic monomers is first heated with a viscosity modifier, then the viscosity-modified chalcogenic monomers are heated with one or more monomers (e.g., with one or more polyfunctional monomers). The nucleophilic viscosity modifier can be, for example, a phosphorus nucleophile (e.g., a phosphine), a sulfur nucleophile (e.g., a thiol) or an amine nucleophile (e.g., a primary or secondary amine). When the chalcogenic monomers are heated in the absence of a nucleophilic viscosity modifier, the chalcogenic monomer rings can open to form, e.g., diradicals, which can combine to form linear chains which can provide a relatively high overall viscosity to the molten material. Nucleophilic viscosity modifiers can break these linear chains into shorter lengths, thereby lowering the overall viscosity of the molten material and making the chalcogenic monomer mixture easier to mix with other species and to stir for efficient processing. Some of the nucleophilic viscosity modifier will react to be retained as a covalently bound part of the polymer, and some will react to form separate molecular species, with the relative amounts depending on nucleophile identity and reaction conditions. While some of the nucleophilic viscosity modifier may end up as a separate molecular species from the polymer chain, as used herein, nucleophilic viscosity modifiers may become part of the polymer. Nonlimiting examples of nucleophilic viscosity modifiers include triphenylphosphine, aniline, benzenethiol, and N,N-dimethylaminopyridine. Nucleophilic viscosity modifiers can be used, for example, in an amount up to about 10 wt %, or even up to about 5 wt % of the CHIP material. When a nucleophilic viscosity modifier is used, in certain embodiments it can be used in the range of about 5 wt % to about 15 wt % of the CHIP material.

In certain embodiments, a monofunctional monomer can be used to reduce the viscosity of the CHIP material, for example, before adding other monomers (e.g., before adding any polyfunctional monomer). For example, in certain embodiments, the CHIP material is first heated with one or more monofunctional monomers. While not intending to be bound by theory, the inventors surmise that inclusion of monofunctional monomers into the polymer chains disrupts intermolecular associations and thus decreases the viscosity. The monofunctional monomer can be, for example, a mono (meth)acrylate such as benzyl methacrylate, a mono(oxirane) such as a styrene oxide or a glycidyl phenyl ether, or a mono(thiirane) such as t-butyl thiirane or phenoxymethylthiirane. A monofunctional monomer can be used to modify the viscosity of the CHIP material, for example, in an amount up to about 10 wt %, up to about 5 wt %, or even up to about 2 wt % of the CHIP material. When a monofunctional monomer is used to modify the viscosity of the CHIP material, in certain embodiments, it can be used in the range of about 0.5 wt % to about 5 wt %, or even about 0.5 wt % to about 3 wt % of the CHIP material.

Of course, viscosity modification is not required, so in other embodiments the chalcogenic monomers are heated together with the one or more monomers (and particularly with one or more polyfunctional monomers) without viscosity modification. In other embodiments, a solvent, e.g., a halobenzene such as 1,2,4-trichlorobenzene, a benzyl ether, or a phenyl ether, can be used to modify the viscosity of the materials for ease of handling. The solvent can be added, for example, to the chalcogenic monomers before reaction with a monomer in order to reduce its viscosity, or to the polymerized material in order to aid in processing into a desired form factor. A decrease in viscosity at elevated temperatures (e.g., >about 140° C.) can allow sufficient flow.

In some embodiments, any of the vulcanization methods described herein may be performed at a temperature of less than about 180° C. In other embodiments, the vulcanization methods may be performed at a temperature of less than about 160° C., less than about 150° C., less than about 140° C., less than about 130° C., less than about 120° C., less than about 110° C., or less than about 100° C.

In further embodiments, any of the vulcanization methods described herein may be performed in a time of less than about 30 min. In other embodiments, the vulcanization methods may be performed in a time of less than about 25 min, less than about 20 min, less than about 15 min, or less than about 10 min. In further embodiments, the vulcanization methods may be performed in a time ranging from about 10-15 min, or about 15-20 min, or about 20-25 min, or about 25-30 min.

According to some embodiments, the vulcanizing agent may comprise a chalcogenic hybrid inorganic/organic polymer (CHIP) material comprising one or more chalcogenic monomers at a level of at least 45 wt % of the CHIP material, and a comonomer at a level in the range of about 5-55 wt % of the CHIP material. In some embodiments, the chalcogenic monomers may comprise elemental sulfur, a liquid polysulfide, an oligomer containing sulfur, an oligomer containing sulfur and selenium units, cyclic selenium sulfides, or monomers derived from elemental sulfur and elemental selenium ($Se_8$). In some embodiments, the comonomer may be diisopropenylbenzene monomer, a norbornene monomer, a norbornadiene monomer, or a derivative thereof.

In other embodiments, the CHIP material may further comprise a termonomer at a level in the range of about 5-45 wt % of the CHIP material. In some embodiments, the termonomer co-polymerizes with the one or more chalcogenic monomers, the comonomer, or both. In some embodiments, the termonomer is different from the comonomer. In some embodiments, the termonomer is an activated arene, a vinylic amine, an N-heterocycle, a cyclic olefin, afunctional olefin with a polar or nucleophilic side chain group, a norbornene monomer, a norbornadiene monomer, a norbornene or norbomadiene derivative, a vinylaniline, or a phenylenediamine.

According to other embodiments, the present invention features a composition comprising a latex material, and a vulcanizing agent comprising a chalcogenic hybrid inorganic/organic polymer (CHIP) material. The vulcanizing agent vulcanizes the latex material to provide a crosslinked rubber. In some embodiments, the vulcanizing agent is in powder form or liquid form to increase miscibility of the latex material.

In some embodiments, the CHIP material may comprise one or more chalcogenic monomers at a level of at least 45 wt % of the CHIP material, and a comonomer at a level in the range of about 5-55 wt % of the CHIP material. The comonomer is co-polymerized with the chalcogenic monomers. In other embodiments, the one or more chalcogenic monomers are at a level of at least 50 wt % of the CHIP material and the comonomer is at a level in the range of about 5-50 wt % of the CHIP material.

In some embodiments, the latex material comprises a natural rubber, a naturally sourced polyene, a polydiene, a polydiene copolymer, polybutadiene, polyisoprene, polychloroprene, a poly(styrene-butadiene-styrene), a butyl rubber, a silicone rubber latex, an acrylic rubber latex, or a combination thereof. In some embodiments, the chalcogenic monomers comprise elemental sulfur, a liquid polysulfide, an oligomer containing sulfur, an oligomer containing sulfur and selenium units, a cyclic selenium sulfide, or monomers derived from elemental sulfur and elemental selenium ($Se_8$).

In other embodiments, the comonomer is selected from a group consisting of an amine monomer, a thiol monomer, a sulfide monomer, an alkynylly unsaturated monomer, an epoxide monomer, a nitrone monomer, an aldehyde monomer, a ketone monomer, a thiirane monomer, an ethylenically unsaturated monomer, a styrenic monomer, a vinylic monomer, a methacrylate monomer, an acrylonitrile monomer, an allylic monomer, an acrylate monomer, a vinylpyridine monomer, an isobutylene monomer, a maleimide monomer, a norbornene monomer, a cyclic olefin monomer, a monomer having at least one vinyl ether moiety, a monomer having at least one isopropenyl moiety, a monomer having at least one imidazole moiety, and a monomer having at least one heterocyclic moiety. In some other embodiments, the comonomer is an activated arene, a vinylic amine, an N-heterocycle, a cyclic olefin, a functional olefin with a polar or a nucleophilic side chain group, a norbornene monomer, a norbornadiene monomer, a norbornene or norbomadiene derivative, a cyclopentadiene, a vinylaniline, or a phenylenediamine.

In some embodiments, the CHIP material further comprises a termonomer that is different from the comonomer. In one embodiment, the termonomer may be an amine monomer, a thiol monomer, a sulfide monomer, an alkynylly unsaturated monomer, an epoxide monomer, a nitrone monomer, an aldehyde monomer, a ketone monomer, a thiirane monomer, an ethylenically unsaturated monomer, a styrenic monomer, a vinylic monomer, a methacrylate monomer, an acrylonitrile monomer, an allylic monomer, an acrylate monomer, a vinylpyridine monomer, an isobutylene monomer, a maleimide monomer, a norbornene monomer, a cyclic olefin monomer, a monomer having at least one vinyl ether moiety, a monomer having at least one isopropenyl moiety, a monomer having at least one imidazole moiety, and a monomer having at least one heterocyclic moiety. In another embodiment, the termonomer may be an activated arene, a vinylic amine, an N-heterocycle, a cyclic olefin, a functional olefin with a polar or a nucleophilic side chain group, a norbomene monomer, a norbornadiene monomer, a vinylaniline, or a phenylenediamine.

In other embodiments, the CHIP material may comprise one or more reactive functional groups. Examples of the functional groups include, but are not limited to, amine, N-heterocyclic, phosphine, or sulfide functional groups.

In some embodiments, the composition may further comprise one or more additives. Non-limiting examples of the additive include an accelerator, a peroxide, a plasticizer, an anti-ozonant, an antioxidant, a retarder, a lubricant, a filler, a colorant or a combination thereof. In some embodiments, the filler may be carbon black or a carbon-based filler.

According to other embodiments, the present invention features a method of preparing a vulcanized rubber. The method may comprise providing a latex material, preparing a vulcanizing agent comprising a chalcogenic hybrid inorganic/organic polymer (CHIP) material, comprising co-polymerizing at least 45 wt % of one or more chalcogenic monomers with about 5-55 wt % of a comonomer, and vulcanizing the latex material with the vulcanizing agent to provide a crosslinked rubber.

As evidenced in Examples 6 and 7, the vulcanization methods of the present invention are at least two times faster than conventional vulcanization. In a preferred embodiment, the vulcanization methods of the present invention are at least 3 times faster than conventional vulcanization. In another preferred embodiment, the vulcanization methods of the present invention are at least 5 times faster than conventional vulcanization. In more preferred embodiments, the vulcanization methods of the present invention are at least 7 times faster than conventional vulcanization. For example, the conventional vulcanization method of Example 6 was completed in about 90 mins, whereas the vulcanization methods of the present invention in Example 7 was completed in just about 12 mins, which is at least a 7-fold decrease in time.

EXAMPLES

The following are non-limiting examples of the present invention, in particular, synthesis of CHIP materials and use of CHIP materials as vulcanizing agents. The examples are for illustrative purposes only and are not intended to limit the invention in any way. Equivalents or substitutes are within the scope of the invention.

Figure 4:
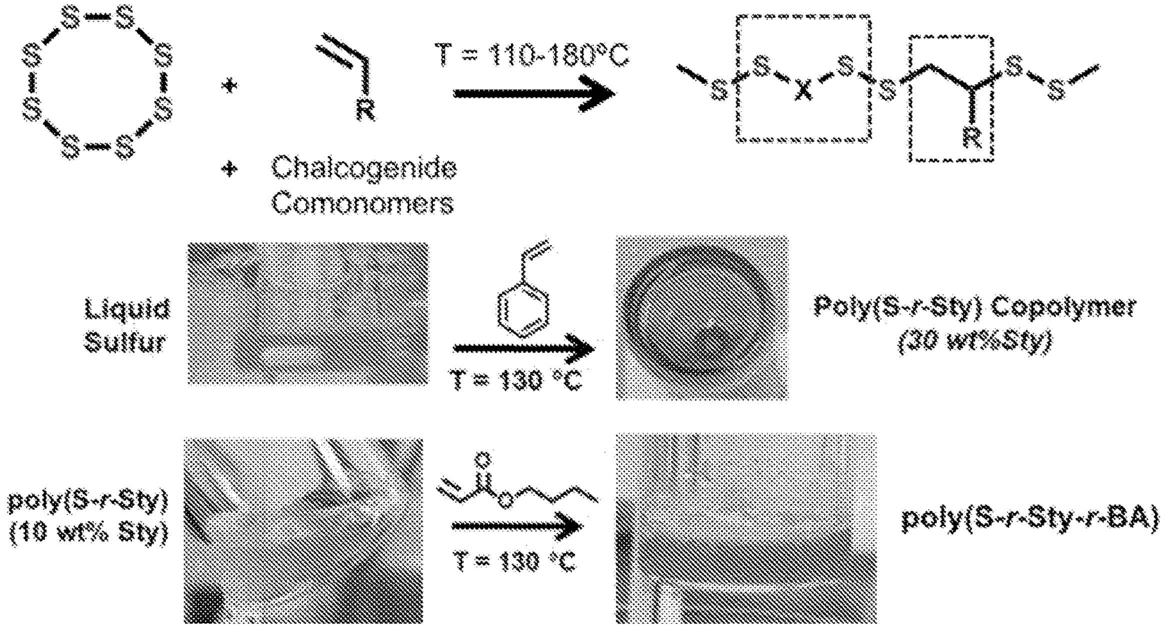
FIG. 4 shows an embodiment in which introduction of an organic comonomer unit improves miscibility of a sulfur vulcanizing agent with inexpensive vinylic, styrenic, or olefinic compounds.
Figure 5:
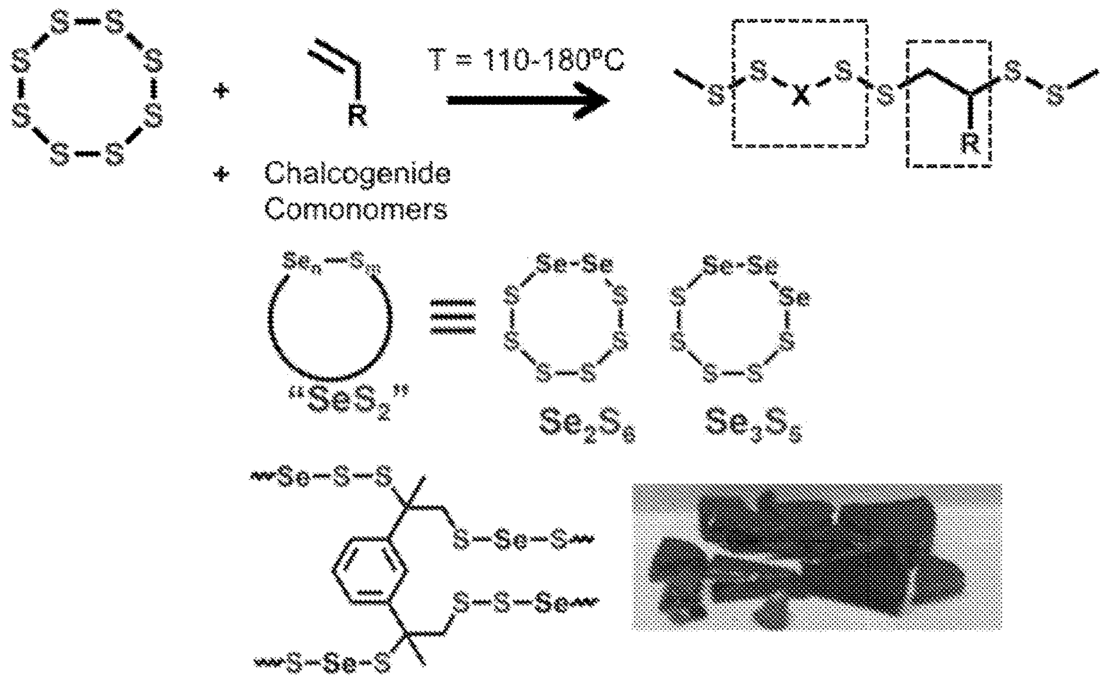
FIG. 5 shows an embodiment of a vulcanizing agent with introduction of stable but weaker bonds than S—S bonds with weaker bonds than S—S bonds through a copolymer backbone (Se—S), or through a photoresponsive organic comonomer unit.
Figure 6:
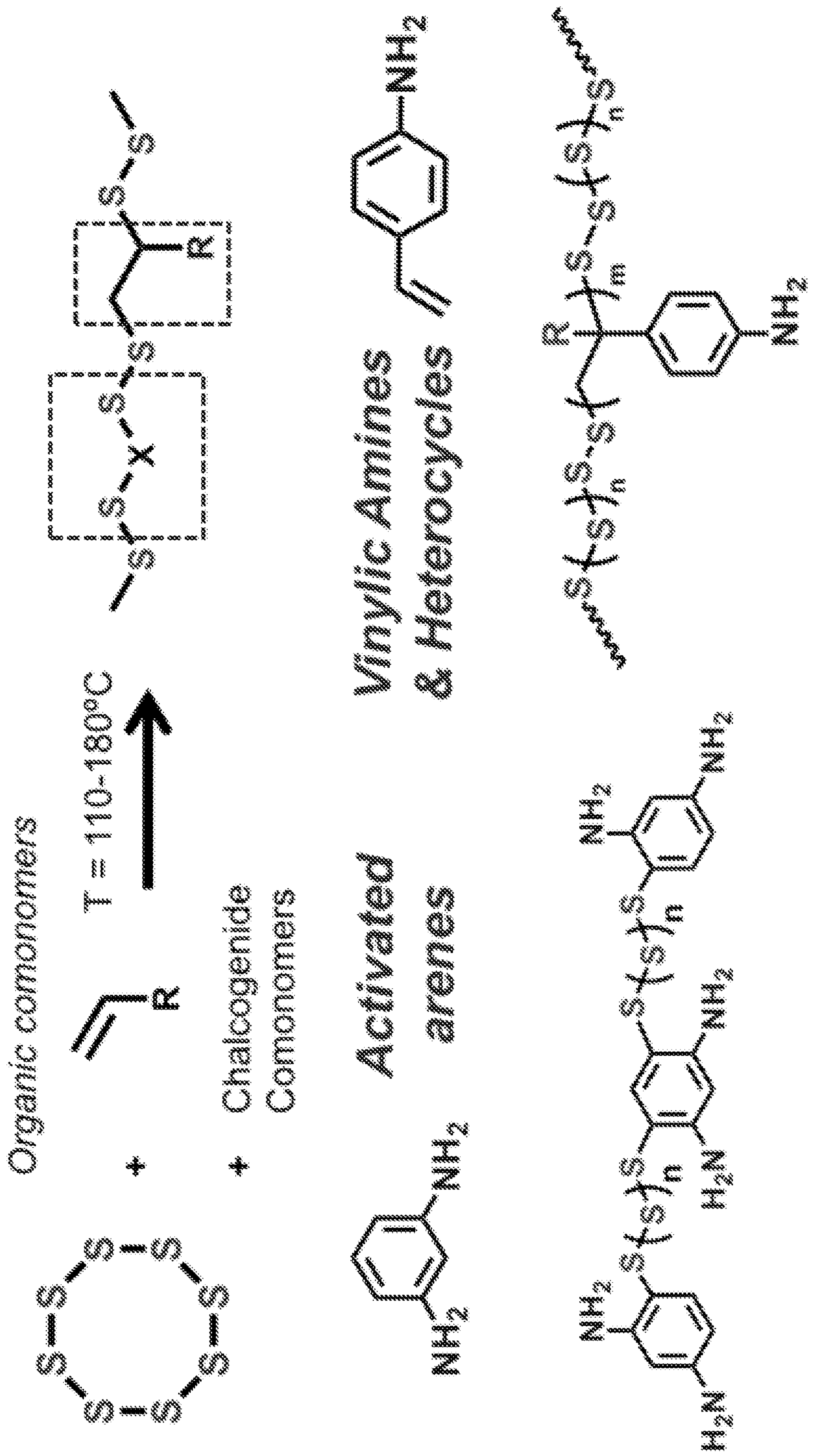
FIG. 6 shows an embodiment featuring installation of accelerators directly onto a sulfur vulcanizing agent that activates at elevated temperatures through an organic comonomer unit.
Figure 7:
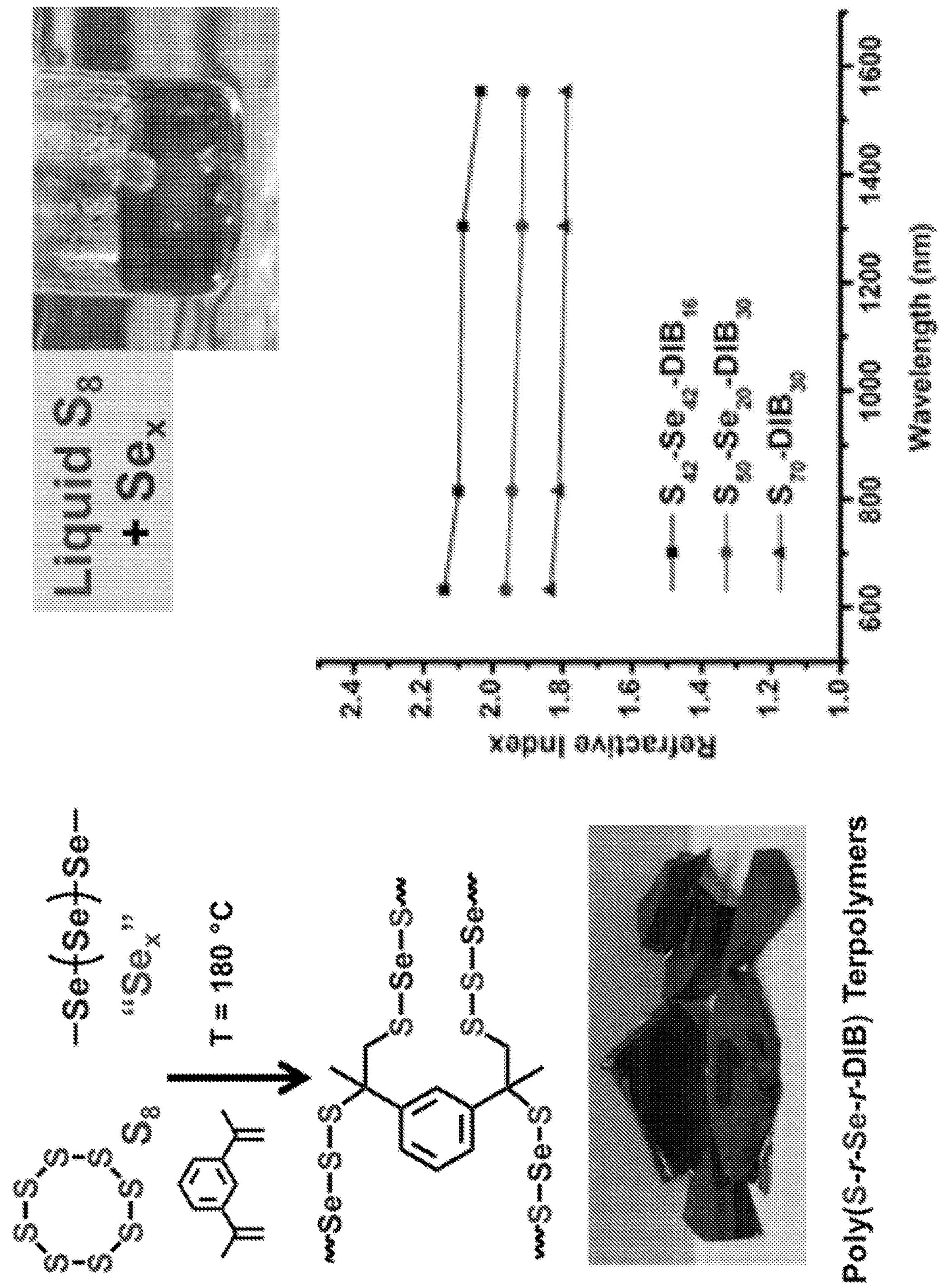
FIG. 7 shows a non-limiting example of polymerizations with elemental selenium.
Figure 8:
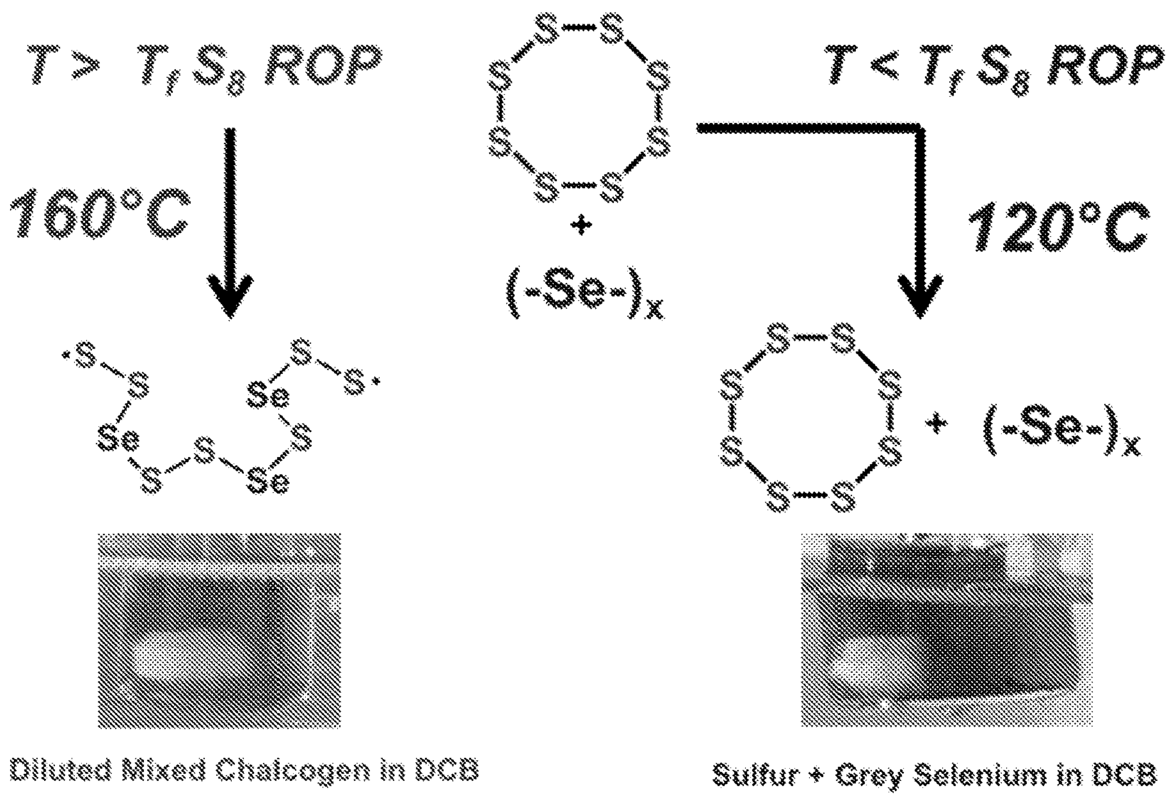
FIG. 8 shows comparative reaction schemes for varying temperatures of polymerization of elemental sulfur and elemental selenium. Lower temperatures can lead to grey selenium cracking.
Figure 9:
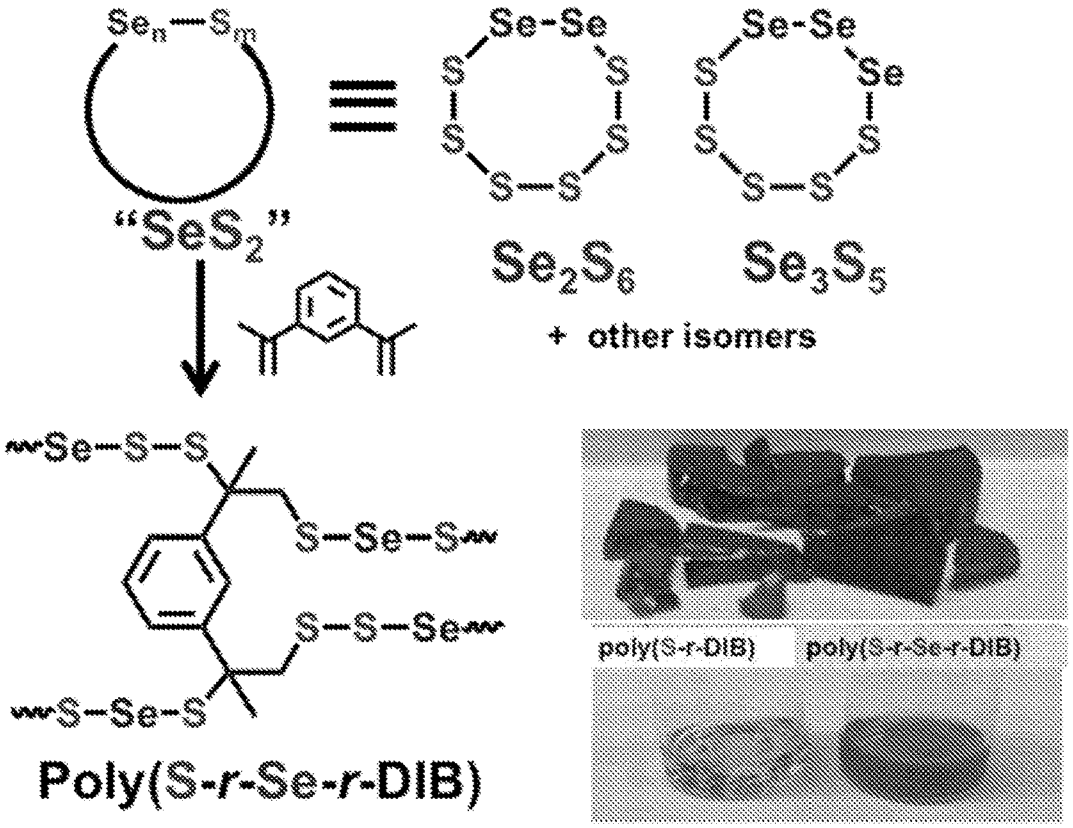
FIG. 9 shows a non-limiting example of inverse vulcanization of selenium sulfide.
Figure 10:
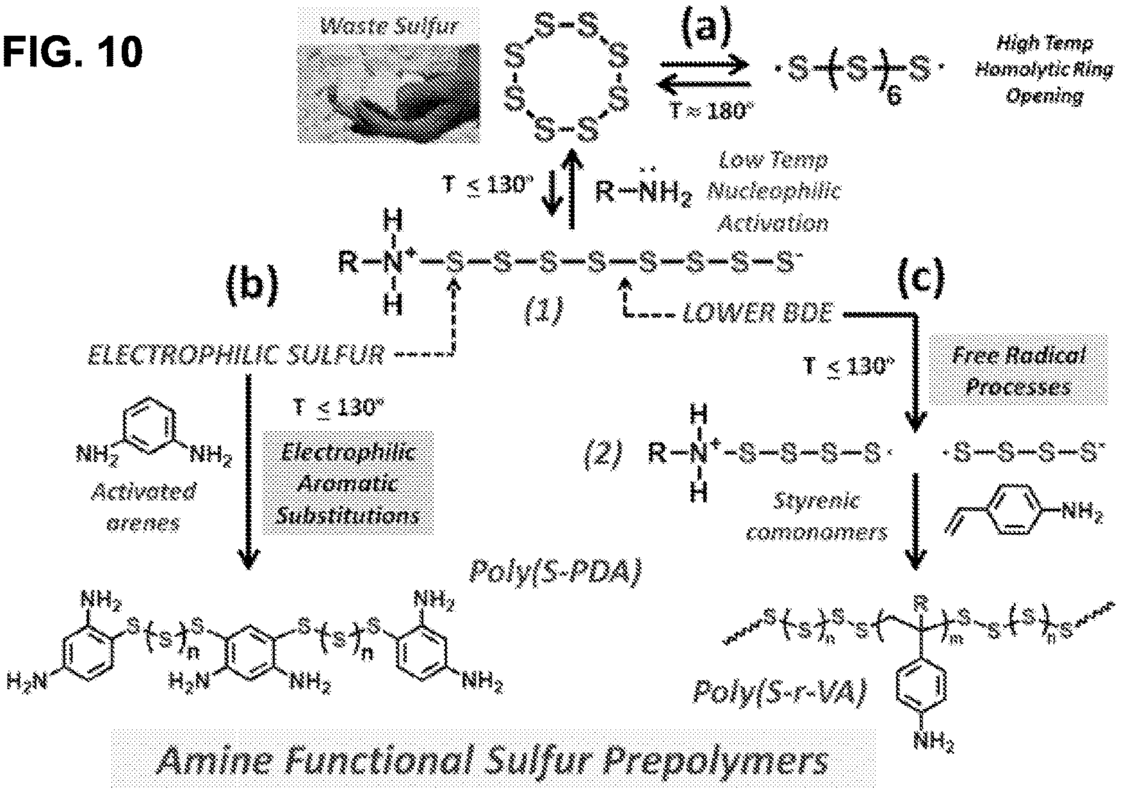
FIG. 10 shows non-limiting examples of introduction of amines and N-heterocycles to CHIP materials.
Figure 11:
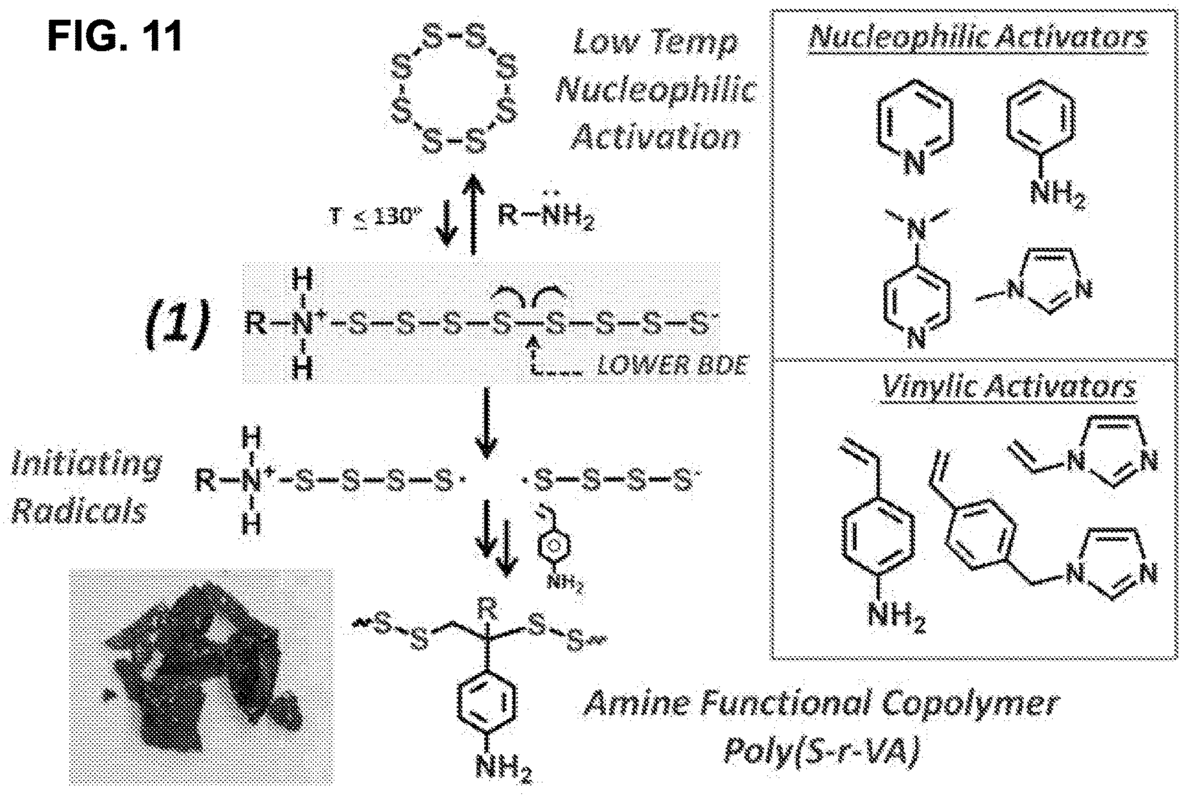
FIG. 11 shows non-limiting examples of the synthesis of aniline functional polysulfides.

EXAMPLE 1: Synthesis of poly(Sulfur-random-Styrene) or p(S-r-Sty) CHIP: Referring now to FIG. 4, to a 20 mL glass vial equipped with a magnetic stir bar, $S_8$ (3.50 g) was added and heated to 130° C. in a thermostatic oil bath until a clear yellow molten phase was formed. Styrene (1.50 g) was added and the reaction was stirred at 130° C. for 6 h yielding an orange fluid. The complete consumption of styrene was confirmed by $^1$HNMR spectra.

EXAMPLE 2: Synthesis of p(S-r-vinylimidazole) CHIP: Sulfur (0.7 g) and vinylimidazole (0.3 g) were added to a small vial equipped with a stir bar. The vial was lowered into a thermostatic oil bath and the reaction was stirred at 130° C. for 2 h. Upon completion of the reaction a black tar-like substance was present in the vial.

EXAMPLE 3: Synthesis of p(S-r-4-vinylaniline) CHIP: Sulfur (0.25 g) was placed in a small vial equipped with a magnetic stir bar. The sulfur was melted in a thermostatic oil bath at 130° C. Using a syringe, 4-vinylaniline (0.25 mL) was added to the molten sulfur and the reaction was stirred at 130° C. for 20 min. Upon completion of the reaction, a red glassy solid remained in the vial.

EXAMPLE 4: Synthesis of p(S-r-1,3-phenylenediamine) CHIP: Sulfur (1.0 g) and 1,3-phenylenediamine (1.0 g) were added to a vial equipped with a metal stir bar and rubber septa. Before heating the reaction, a $H_2S$ trap composed of concentrated NaOH was prepared. A constant flow of Ar into the reaction vial and outlet into the NaOH trap ensured effective $H_2S$ trapping. The vial was lowered into a thermostatic oil bath and allowed to react at 130° C. for 30 minutes. Upon completion of the reaction, a viscous, red liquid was present.

EXAMPLE 5: Synthesis of p(S-r-Sty-r-1,3-phenylenediamine) CHIP: P(S-r-Sty) (9.0 g, 70 wt % S) and 1,3-phenylenediamine (1.0 g) were added to a vial equipped with a metal stir bar and rubber septa. Before heating the reaction, a $H_2S$ trap composed of concentrated NaOH was prepared. A constant flow of Ar into the reaction vial and outlet into the NaOH trap ensured effective $H_2S$ trapping. The vial was lowered into a thermostatic oil bath and allowed to react at 130° C. for 30 minutes. Upon completion of the reaction, a viscous, red liquid was present.

Figure 3A:
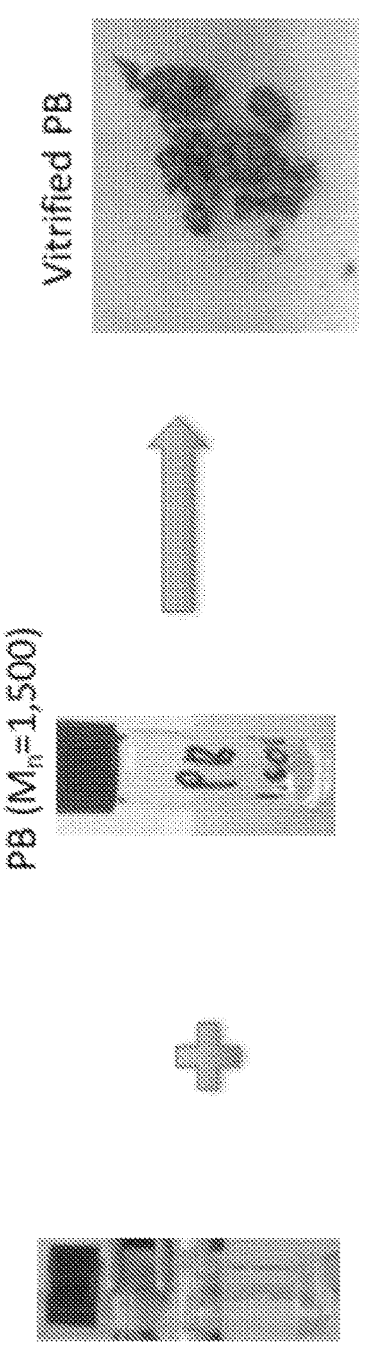
FIG. 3A shows an example reaction of liquid sulfur (left) with low molar mass polybutadiene (Mn~1500 g/mol).
Figure 3B:
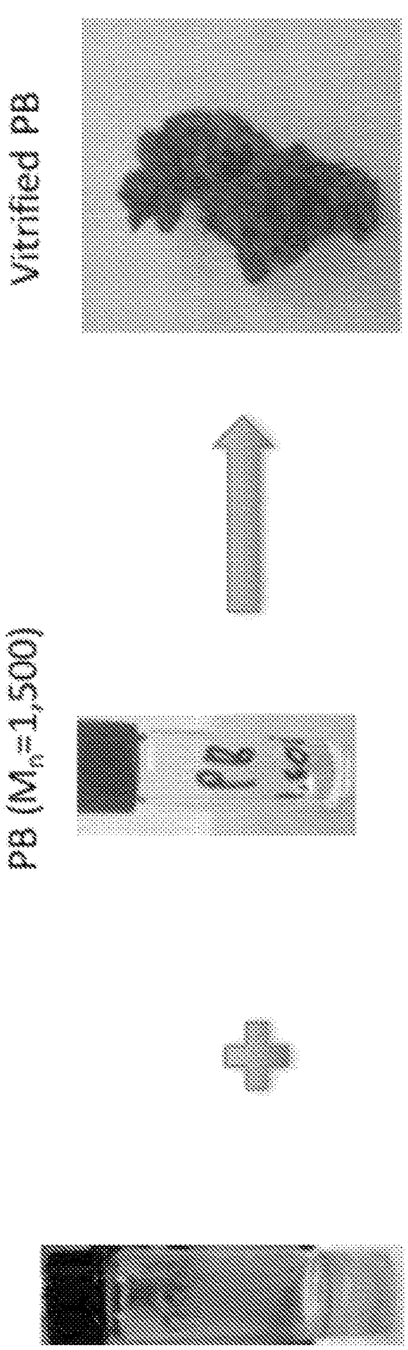
FIG. 3B shows an example reaction of poly(styrene-random-sulfur) CHIP copolymer (left) with low molar mass polybutadiene (Mn~1500 g/mol).

EXAMPLE 6: Vulcanization using sulfur as vulcanizing agent: Referring now to FIG. 3A, sulfur (0.2 g), polybutadiene (0.8 g, ~1,500 $M_n$), and pyrene (0.05 g) were added to a small vial equipped with a stir bar. The vial was lowered into a thermostatic oil bath set at 160° C. The reaction was allowed to stir for ~90 min. until it became a black rubber.

Figure 3C:
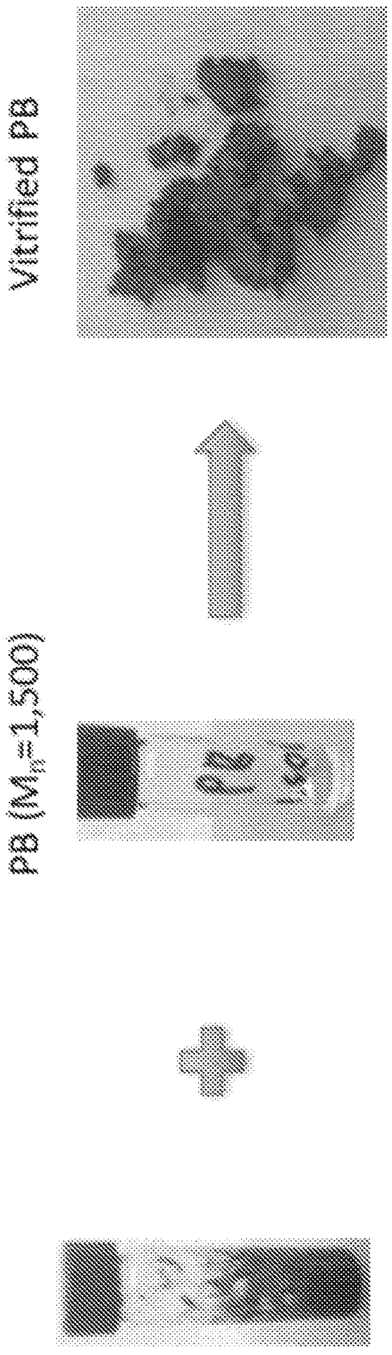
FIG. 3C shows an example reaction of a CHIP copolymer from sulfur and N-vinylimidazole (left) with low molar mass polybutadiene (Mn~1500 g/mol).

EXAMPLE 7: Vulcanization using p(S-r-vinylimidazole) CHIP as vulcanizing agent: Referring now to FIG. 3C, P(S-r-vinylimidazole) (0.286 g), polybutadiene (0.714 g, ~1,500 $M_n$), and pyrene (0.05 g) were added to a small vial equipped with a stir bar. The vial was lowered into a thermostatic oil bath set at 160° C. The reaction was allowed to stir for ~12 min. until it became a black rubber.

Figure 12:
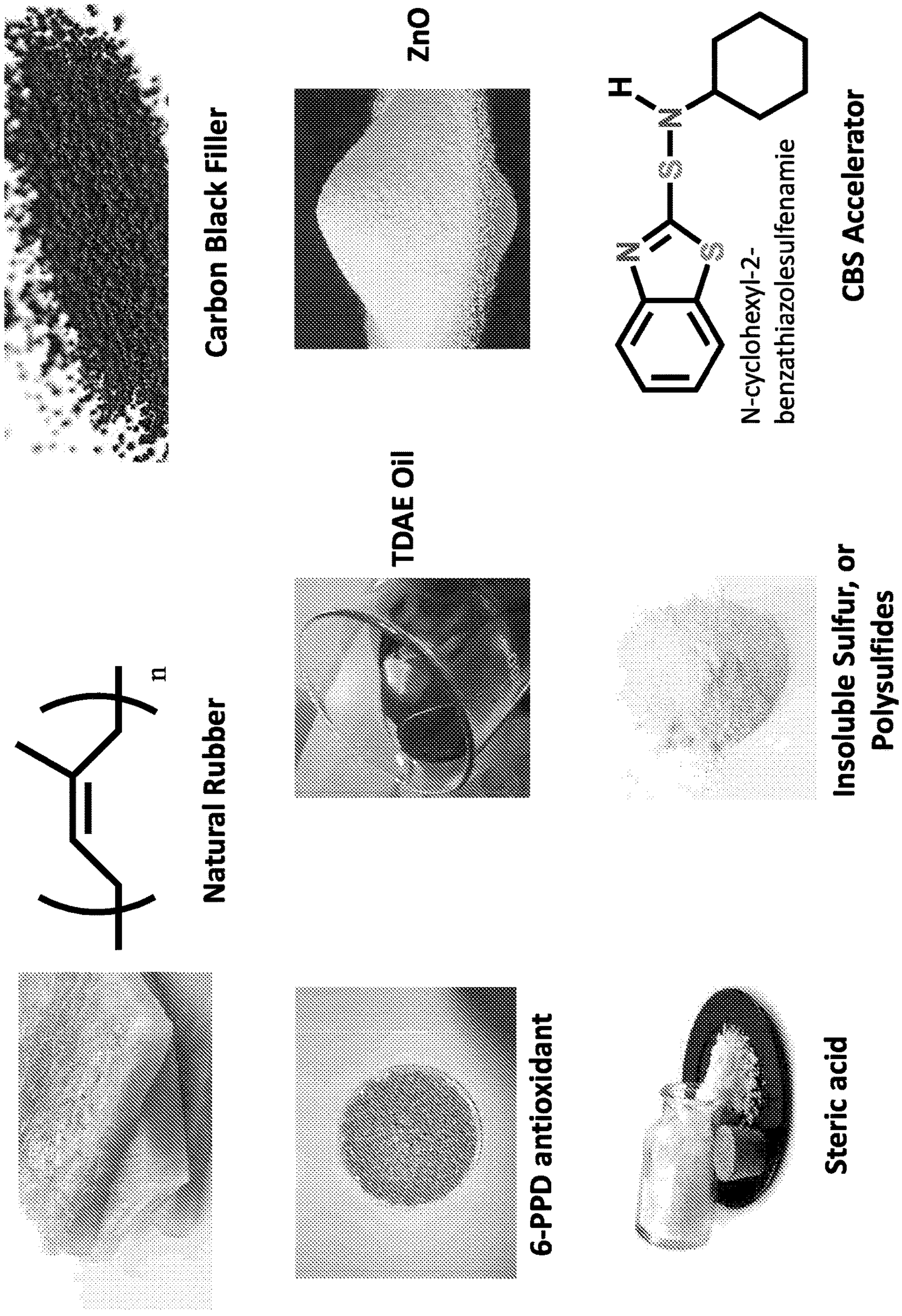
FIG. 12 is a non-limiting example of a rubber formulation in accordance with the present invention.

EXAMPLE 8: Vulcanization using organo organpolysulfide materials: Referring to FIG. 12, a non-limiting example of rubber formulation is shown. In some embodiments, the rubber formulation may comprise about 100 parts of natural rubber, 50 parts of carbon black, about 2-3 parts of 6-PPD antioxidant, about 2 parts of TDAE oil, about 2.5 parts of ZnO, about 1 part of stearic acid, about 1-6 parts of organopolysulfide, and about 1.5 parts CBS Accelerator.

EXAMPLE 9: Vulcanization using p(S-r-norbomene) CHIP as vulcanizing agent: Elemental sulfur and the comonomer, vinyl norbornene, were reacted to produce p(S-r-norbomene), which was then used as a vulcanizing agent with natural rubber. This CHIP composition resulted in a superior property, suppressed rubber version, as compared to the use of insoluble sulfur, and increased overall stiffness of the vulcanized rubber at higher sulfur concentrations. Furthermore, the use of p(S-r-norbornene), as compared to insoluble sulfur, did not appear to have materially and negatively impacted the rubber tensile strength, another important property.

EXAMPLE 10: Properties of natural rubber vulcanized using organpolysulfide materials: The benefits of varying the organic comonomer structure in the organopolysulfide materials derived from the inverse vulcanization of elemental sulfur were investigated. Inventors systematically varied the sulfur copolymer structure for tuning compatibility with various types of natural or synthetic rubber liquid resins to prepare crosslinked, vulcanizationed rubber. The method afforded improvement in the post-curing properties, a broad range of crosslinked rubber, and pointed to the advantages of using sulfur derived sulfur copolymers in comparison to current sulfur crosslinking agents in the market.

Moving Die Rheometry measures the change in stiffness of a rubber sample. The sample is compressed between two heated plates and by an applied oscillating force. The degree of vulcanization determines the cure characteristic of the sample as it is heated and compressed. Referring to FIGS. 13A-13D, the y-axis represents increasing torque which correlates to increasing stiffness from rubber curing. The loss of rubber stiffness over time is referred to as "reversion", which is an undesirable quality. Reversion indicates that more of the sulfur crosslinker was not efficiently used.

Figure 13A:
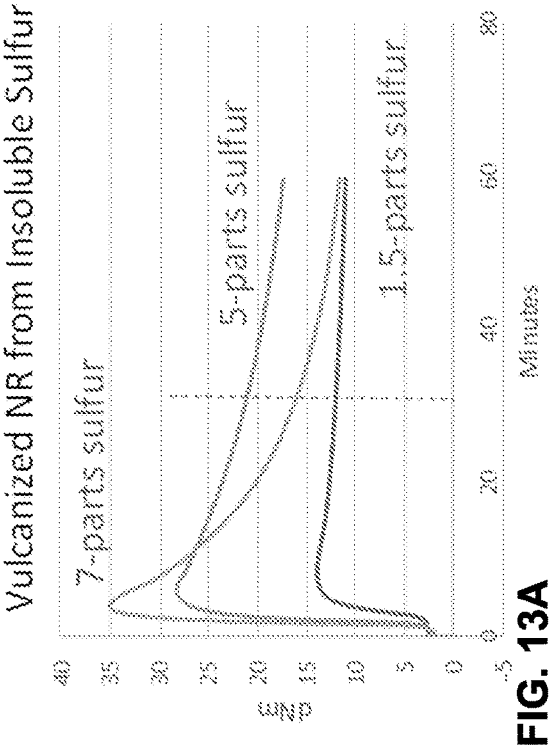
FIGS. 13A-13D show the Moving Die Rheometry of vulcanized natural rubber (NR) using various sulfur cross-linkers, where dNm is deci Newton Meter
Figure 13B:
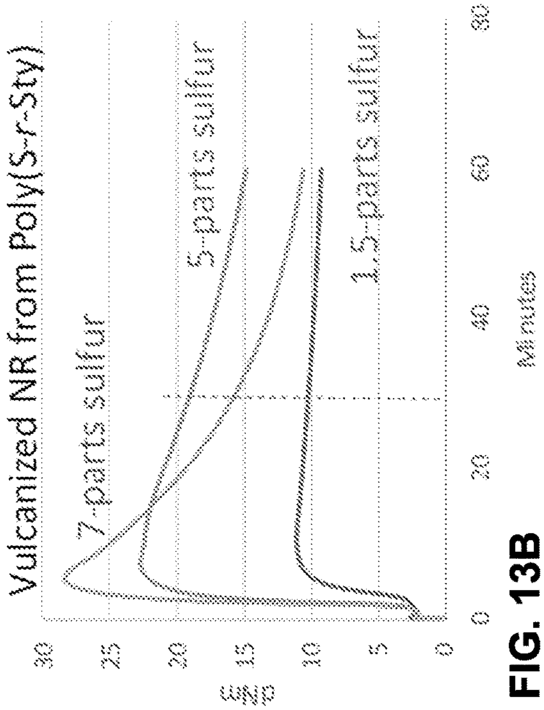
Figure 13C:
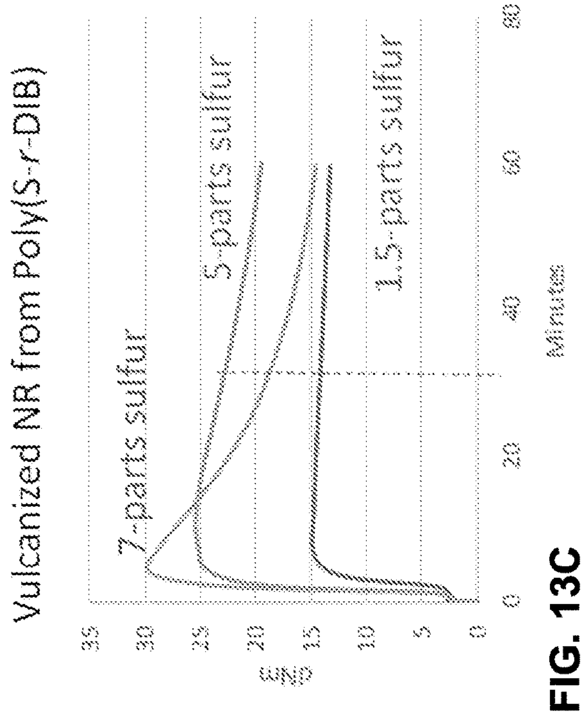
Figure 13D:
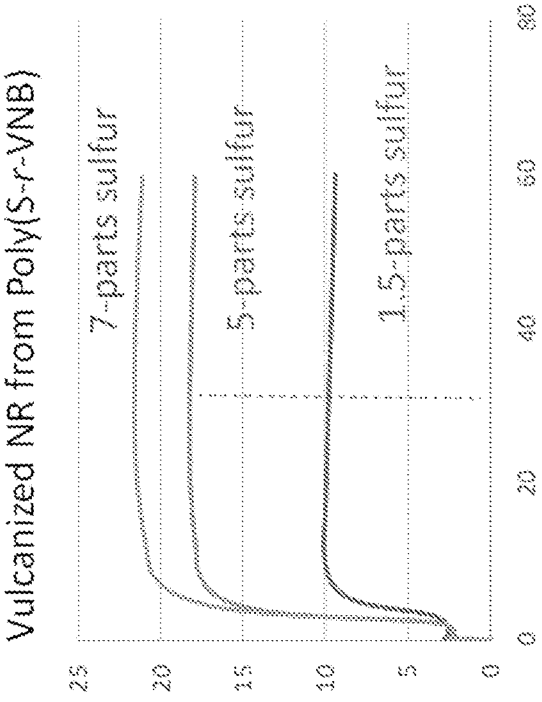

In FIG. 13A, natural rubber was vulcanized using insoluble sulfur in accordance with industry standards. Over time, the rubber will undergo the reversion process. Without wishing to limit the present invention to a particular theory or mechanism, the CHIP composition of the present invention can suppress the reversion process. In a non-limiting embodiment, the CHIP composition prepared from sulfur and vinyl-norbornene was able to suppress rubber reversion as shown from MDR characterization in FIG. 13D. This is an important improvement in vulcanization of natural rubber.

Figure 14:
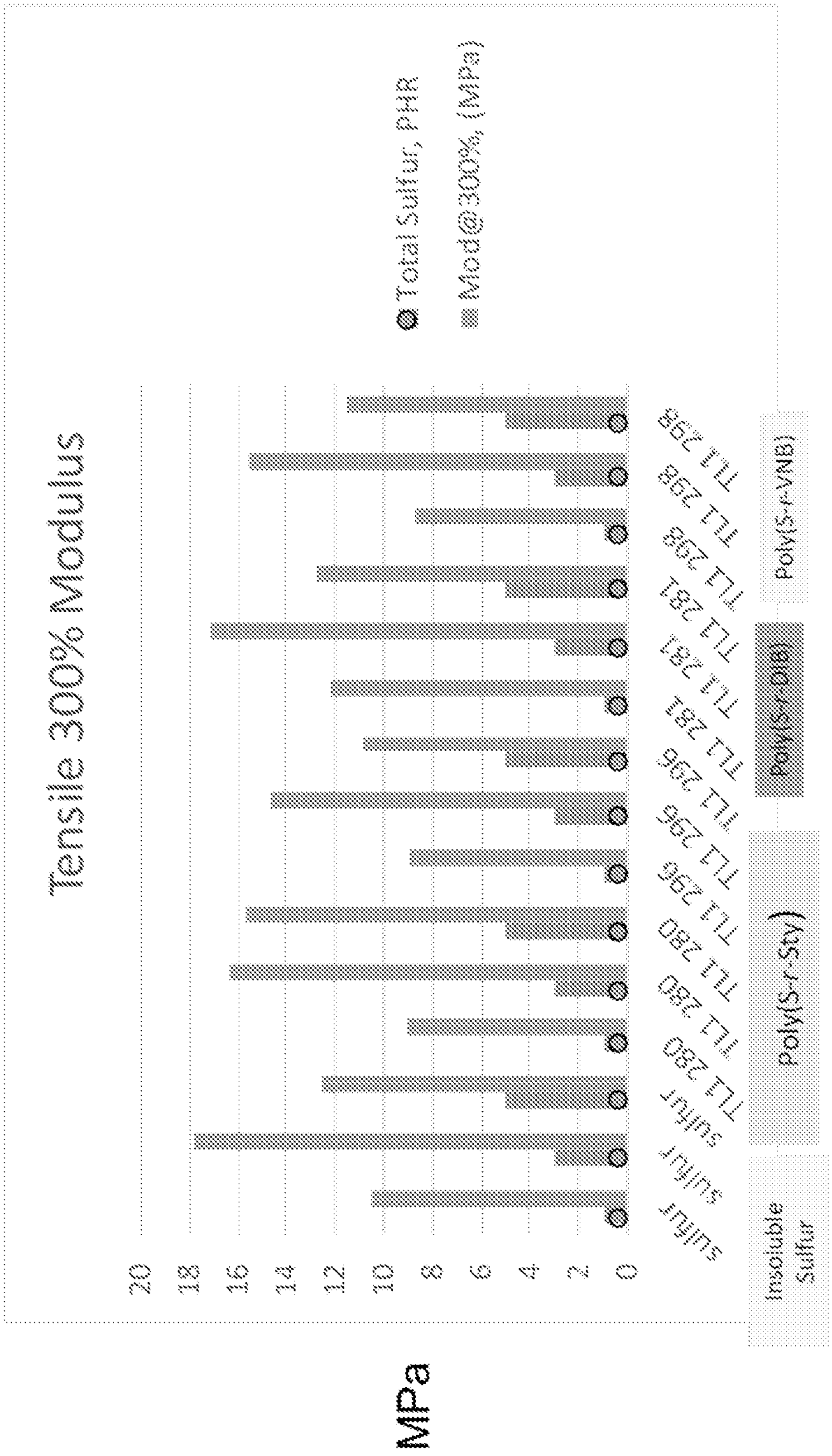
FIG. 14 shows the tensile strength of vulcanized NR using various sulfur crosslinkers.

FIG. 14 shows the tensile strength of rubber at 300% elongation common assay for mechanical properties. The results demonstrate that despite comonomer variation, the polysulfides afford crosslinked natural rubber on par with rubber from insoluble sulfur, which is the industry standard.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A vulcanizing agent comprising a chalcogenic hybrid inorganic/organic polymer (CHIP) material, wherein the CHIP material comprises:

a. one or more chalcogenide monomers at a level of at least 45 wt % of the CHIP material; and b. a comonomer at a level in the range of about 5-55 wt % of the CHIP material, wherein the comonomer is a vinylic amine, a vinylaniline, a phenylenediamine, or a derivative thereof.

2. The vulcanizing agent of claim 1, wherein the chalcogens monomers comprise elemental sulfur, a liquid polysulfide, an oligomer containing sulfur, an oligomer containing sulfur and selenium units, cyclic selenium sulfides, or monomers derived from elemental sulfur and elemental selenium ($Se_8$).

3. The vulcanizing agent of claim 1, wherein the CHIP material further comprises a termonomer at a level in the range of about 5-45 wt % of the CHIP material, wherein the termonomer is co-polymerized with the one or more chalcogenic monomers and the comonomer, wherein the termonomer is different from comonomer.

4. The vulcanizing agent of claim 3, wherein the termonomer is an activated arene, a vinylic amine, an N-heterocycle, a cyclic olefin, a functional olefin with a polar or nucleophilic side chain group, a norbornene monomer, a norbornadiene monomer, a vinylaniline, or a phenylenediamine.

5. The vulcanizing agent of claim 1, wherein the vulcanizing agent is in powder form or liquid form.

6. A composition comprising:

a. a latex material; and b. a vulcanizing agent comprising a chalcogenic hybrid inorganic/organic polymer (CHIP) material, wherein the CHIP material comprises:

i. one or more chalcogenic monomers at a level of at least 45 wt % of the CHIP material; and ii. a comonomer at a level in the range of about 5-55 wt % of the CHIP material, wherein the comonomer is a vinylic amine, a vinylaniline, a phenylenediamine, or a derivative thereof, wherein the comonomer is co-polymerized with the chalcogenic monomers; wherein the vulcanizing agent vulcanizes the latex material to provide a crosslinked rubber.

7. The composition of claim 6, wherein the latex material comprises a natural rubber, a naturally sourced polyene, a polydiene, a polydiene copolymer, polybutadiene, polyisoprene, polychloroprene, a poly(styrene-butadiene-styrene), a butyl rubber, a silicone rubber latex, an acrylic rubber latex, or a combination thereof.

8. The composition of claim 6, wherein the one or more chalcogenic monomers are at a level of at least 50 wt % of the CHIP material and the comonomer is at a level in the range of about 5-50 wt % of the CHIP material.

9. The composition of claim 6, wherein the chalcogenic monomers comprise elemental sulfur, a liquid polysulfide, an oligomer containing sulfur, an oligomer containing sulfur and selenium units, a cyclic selenium sulfide, or monomers derived from elemental sulfur and elemental selenium ($Se_8$).

10. The composition of claim 6, wherein the CHIP material further comprises a termonomer that is different from the comonomer.

11. The composition of claim 10, wherein the termonomer is selected from a group consisting of an amine monomer, a thiol monomer, a sulfide monomer, an alkynylly unsaturated monomer, an epoxide monomer, a nitrone monomer, an aldehyde monomer, a ketone monomer, a thiirane monomer, an ethylenically unsaturated monomer, a styrenic monomer, a vinylic monomer, a methacrylate monomer, an acrylonitrile monomer, an allylic monomer, an acrylate monomer, a vinylpyridine monomer, an isobutylene monomer, a maleimide monomer, a norbornene monomer, a cyclic olefin monomer, a monomer having at least one vinyl ether moiety, a monomer having at least one isopropenyl moiety, a monomer having at least one imidazole moiety, and a monomer having at least one heterocyclic moiety.

12. The composition of claim 10, wherein the termonomer is an activated arene, a vinylic amine, an N-heterocycle, a cyclic olefin, a functional olefin with a polar or a nucleophilic side chain group, a norbornene monomer, a norbornadiene monomer, a vinylaniline, or a phenylenediamine.

13. The composition of claim 6, further comprising one or more additives, wherein the additive comprises an accelerator, a peroxide, a plasticizer, an anti-ozonant, an antioxidant, a retarder, a lubricant, a filler, a colorant or a combination thereof.

14. The composition of claim 13, wherein the filler is carbon black or a carbon-based filler.

15. The composition of claim 6, wherein the CHIP material comprises one or more reactive functional groups.

16. The composition of claim 15, wherein the functional groups are amine, N-heterocyclic, phosphine, or sulfide functional groups.

17. The composition of claim 6, wherein the vulcanizing agent is in powder form or liquid form to increase miscibility of the latex material.

18. A vulcanizing agent comprising a chalcogenic hybrid inorganic/organic polymer (CHIP) material, wherein the CHIP material comprises:

a. one or more chalcogenide monomers at a level of at least 45 wt % of the CHIP material, wherein the one or more chalcogenic monomers comprise sulfur and selenium; and b. a comonomer at a level in the range of about 5-55 wt % of the CHIP material, wherein the comonomer is co-polymerized with the one or more chalcogenic monomers.

19. The vulcanizing agent of claim 18, wherein the vulcanizing agent is in powder form or liquid form.

* * * * *